US010320312B2

(12) United States Patent
Banduric

(10) Patent No.: US 10,320,312 B2
(45) Date of Patent: Jun. 11, 2019

(54) COMPLEX ELECTRIC FIELDS AND STATIC ELECTRIC FIELDS TO EFFECT MOTION WITH CONDUCTION CURRENTS AND MAGNETIC MATERIALS

(71) Applicant: Richard Banduric, Aurora, CO (US)

(72) Inventor: Richard Banduric, Aurora, CO (US)

(*) Notice: Subject to any disclaimer, the term of this patent is extended or adjusted under 35 U.S.C. 154(b) by 0 days.

(21) Appl. No.: 15/653,130

(22) Filed: Jul. 18, 2017

(65) Prior Publication Data

US 2017/0366108 A1    Dec. 21, 2017

Related U.S. Application Data

(63) Continuation-in-part of application No. 15/422,270, filed on Feb. 1, 2017, now Pat. No. 10,084,395, which
(Continued)

(30) Foreign Application Priority Data

May 30, 2017   (AU) ................................ 2017203604

(51) Int. Cl.
*H02N 11/00* (2006.01)
*B64G 1/40* (2006.01)
(Continued)

(52) U.S. Cl.
CPC ............ *H02N 11/00* (2013.01); *B64G 1/409* (2013.01); *H02K 3/02* (2013.01); *H02K 3/04* (2013.01); *H02K 3/30* (2013.01); *H02N 1/002* (2013.01); *H02N 1/008* (2013.01); *H02N 11/006* (2013.01); *H02N 11/008* (2013.01)

(58) Field of Classification Search
CPC ..... H02N 11/006; H02N 11/008; B64G 1/409
See application file for complete search history.

(56) References Cited

U.S. PATENT DOCUMENTS 1,974,483 A    9/1934   Brown
2,949,550 A    8/1960   Brown
(Continued)

FOREIGN PATENT DOCUMENTS

AU    2013286987    1/2014
AU    2017203604    6/2017
(Continued)

OTHER PUBLICATIONS

Bahder, Thomas B. et al., "Force on an Asymmetric Capacitor", Army Research Laboratory, Adelphi, MD, Mar. 2003, 34 pp.
(Continued)

*Primary Examiner* — Bentsu Ro
(74) *Attorney, Agent, or Firm* — Trenner Law Firm, LLC; Mark D. Trenner

(57) ABSTRACT

In an example, a method includes interacting electric fields from charges in conductors in different inertial reference frames to effect motion. The example method implements the mathematical framework that divides electric fields from charges in different inertial reference frames into separate electric field equations in electrically isolated conductors. The example method may implement the interaction of these electric fields to produce a force on an assembly that can, by way of illustration, propel a spacecraft using electricity without other propellant(s).

15 Claims, 17 Drawing Sheets

Related U.S. Application Data is a continuation-in-part of application No. 15/091,359, filed on Apr. 5, 2016, now Pat. No. 10,027,257, which is a continuation of application No. 13/543,688, filed on Jul. 6, 2012, now Pat. No. 9,337,752.

(51) Int. Cl.
| | |
|---|---|
| *H02N 1/00* | (2006.01) |
| *H02K 3/02* | (2006.01) |
| *H02K 3/04* | (2006.01) |
| *H02K 3/30* | (2006.01) |

(56) References Cited

U.S. PATENT DOCUMENTS

| | | | |
|---|---|---|---|
| 3,018,394 | A | 1/1962 | Brown |
| 3,022,430 | A | 2/1962 | Brown |
| 3,187,206 | A | 6/1965 | Brown |
| 3,196,296 | A | 7/1965 | Brown |
| 3,591,826 | A | 7/1971 | Valles |
| 3,596,135 | A | 7/1971 | Stenger, Jr. et al. |
| 3,610,971 | A | 10/1971 | Hooper |
| 3,656,013 | A | 4/1972 | Hooper |
| 3,722,285 | A | 3/1973 | Weber |
| 3,760,265 | A | 9/1973 | Hutch |
| 3,916,691 | A * | 11/1975 | Hollander ............... G01K 7/13 324/435 |
| 4,224,540 | A | 9/1980 | Okubo |
| 4,463,825 | A | 8/1984 | Lerwill |
| 4,642,504 | A | 2/1987 | Jacobsen |
| 4,736,127 | A | 4/1988 | Jacobsen |
| 5,054,081 | A | 10/1991 | West |
| 5,845,220 | A | 12/1998 | Puthoff |
| 5,949,311 | A | 9/1999 | Weiss et al. |
| 6,411,493 | B2 | 6/2002 | Campbell |
| 7,078,994 | B2 | 7/2006 | Martin et al. |
| 7,602,181 | B1 | 10/2009 | Gerald, II et al. |
| 8,053,948 | B2 | 11/2011 | Suzuki et al. |
| 9,337,752 | B2 | 5/2016 | Banduric |
| 10,027,257 | B2 | 7/2018 | Banduric |
| 10,084,395 | B2 | 9/2018 | Banduric |
| 2004/0108195 | A1 | 6/2004 | D'Amico et al. |
| 2005/0197808 | A1 | 9/2005 | Kuo |
| 2007/0034514 | A1 | 2/2007 | Riera |
| 2007/0213954 | A1 | 9/2007 | Price |
| 2009/0085411 | A1 | 4/2009 | Qiang |
| 2012/0119857 | A1 | 5/2012 | Nassikas |
| 2014/0009098 | A1 | 1/2014 | Banduric |
| 2016/0218644 | A1 | 7/2016 | Banduric |
| 2017/0149362 | A1 | 5/2017 | Banduric |

FOREIGN PATENT DOCUMENTS

| | | |
|---|---|---|
| EP | 0436405 | 7/1991 |
| EP | 0486243 | 5/1992 |
| GB | 300311 | 11/1928 |

OTHER PUBLICATIONS

Canning, Francis X., et al., "Asymmetrical Capacitors for Propulsion", Institute for Scientific Research, Inc., Fairmount, West Virginia, Oct. 2004, 23 pp.

Moon, Parry, et al., "The Coulomb Force and the Ampere Force", Apr. 1954, 11 pp.

Hooper, William J., "New Horizons in Electric, Magnetic & Gravitational Field Theory", http://www.rexresearch.com/hooper/horizon.htm; 52 pp.

Hartman, James E., "A Review of William J. Hooper and his All-Electric Motional Electric Field Generator", http://www.rexresearch.com/hooper/hooper1.htm; Feb. 2, 1996; 4 pp.

Drury, David M., "The Unification of the Lorentz and Coulomb Gauges of Electromagnetic Theory", IEEE Transactions on Education, vol. 43, No. 1, Feb. 2000, 4 pp.

Klicker, Kyle A., "Motional Electric Fields Associated with Relative Moving Charge", 1986, 67 pp.

Biefeld-Brown effect located at http://en.wikipedia.org/wiki/Biefeid%E2%80%93Brown_effect, 5 pp.

Written Opinion of the International Searching Authority in PCT/US2013/048410 dated Jan. 6, 2015; 5 pages.

International Search Report and Written Opinion dated Sep. 25, 2013 in PCT/US2013/048410, 9 pages.

K.J. Van Vlaenderen and A. Waser; Generalisation of Classical Electrodynamics to Admit a Scalar Field and Longitudinal Waves; Hardonic Journal 24, 609-628 (2001).

A.K.T. Assis and Marcelo Bueno; Longitudinal Forces in Weber's Electrodynamics; International Journal of Modern Physics B, vol. 9, No. 28 (1995) 3689-3969.

Lars Johansson; Longitudinal Electrodynamic Forces and their Possible Technological Applications; Master of Science Thesis; Lund Institute of Technology, Sweden (1996).

Extended European Search Report in EPO Patent Application No. 18154781.1-1201, dated Jun. 14, 2018, 7 pages.

Theoretical and Mathematical Description Including an in-depth Analysis of Relativistic Electric Fields and the Methods to Effect Motion in New Electrodynamics journal, by Richard Banduric, dated Dec. 21, 2012, 118 pages.

Gradient, Divergence, Curl and Related Formulae, 24 pages, date as best can be determined from www.bolvan.ph.utexas.edu/~vadim/classes/17f for the PDF document diffop.pdf (see printout at end of NPL reference uploaded herewith) is "last updated Sep. 12, 2017".

Lecture 3—Moving Charges, Electric Conduction, Current, Resistance, Metals and Semiconductors, dated May 27, 2011, 43 pages.

Electrical Conduction in Metals and Semiconductors, by Safa Kasap et al., dated Feb. 14, 2017, 28 pages.

European Patent Office Action for Application No. 13812604.0, dated Jan. 14, 2016, 3 pp.

Extended European Search Report for Application No. 13812604.0, dated Apr. 20, 2016, 8 pp.

Australian Government Examination Report No. 1 for standard patent application, 8 pages.

C. Monstein and J.P. Wesley, "Observation of scalar longitudinal electrodynamic waves", Europhysics Letters, 2002, pp. 514-520, vol. 59, Zurich, Switzerland.

Richard Banduric, "Relativistic Propulsion Simplified Description and Implementation," New Electrodynamics, Dec. 28, 2014, pp. 1-28, Aurora, Colorado.

Richard Banduric, "Theoretical and Mathematical Description Including an In-Depth Analysis of Relativistic Electric Fields and the Methods to Effect Motion," New Electrodynamics, Dec. 21, 2012, pp. 1-115 , Aurora, Colorado.

N. Graneau et al., An experimental confirmation of longitudinal electrodynamic forces, The European Physical Journal D, 2001, pp. 87-97.

Thomas E. Phipps, Jr., "Experiments Verifying Ampere Longitudinal Forces Via "Force Modulation" Methods," Infinite Energy, 2005, pp. 10-20, Issue 63, Urbana, Illinois.

William J. Leonard et al., "Minds on Physics:Interaction," Jan. 1999, 4 pages, vol. 2, Section R50, Kendall Hunt Pub Co., Massachusets.

* cited by examiner

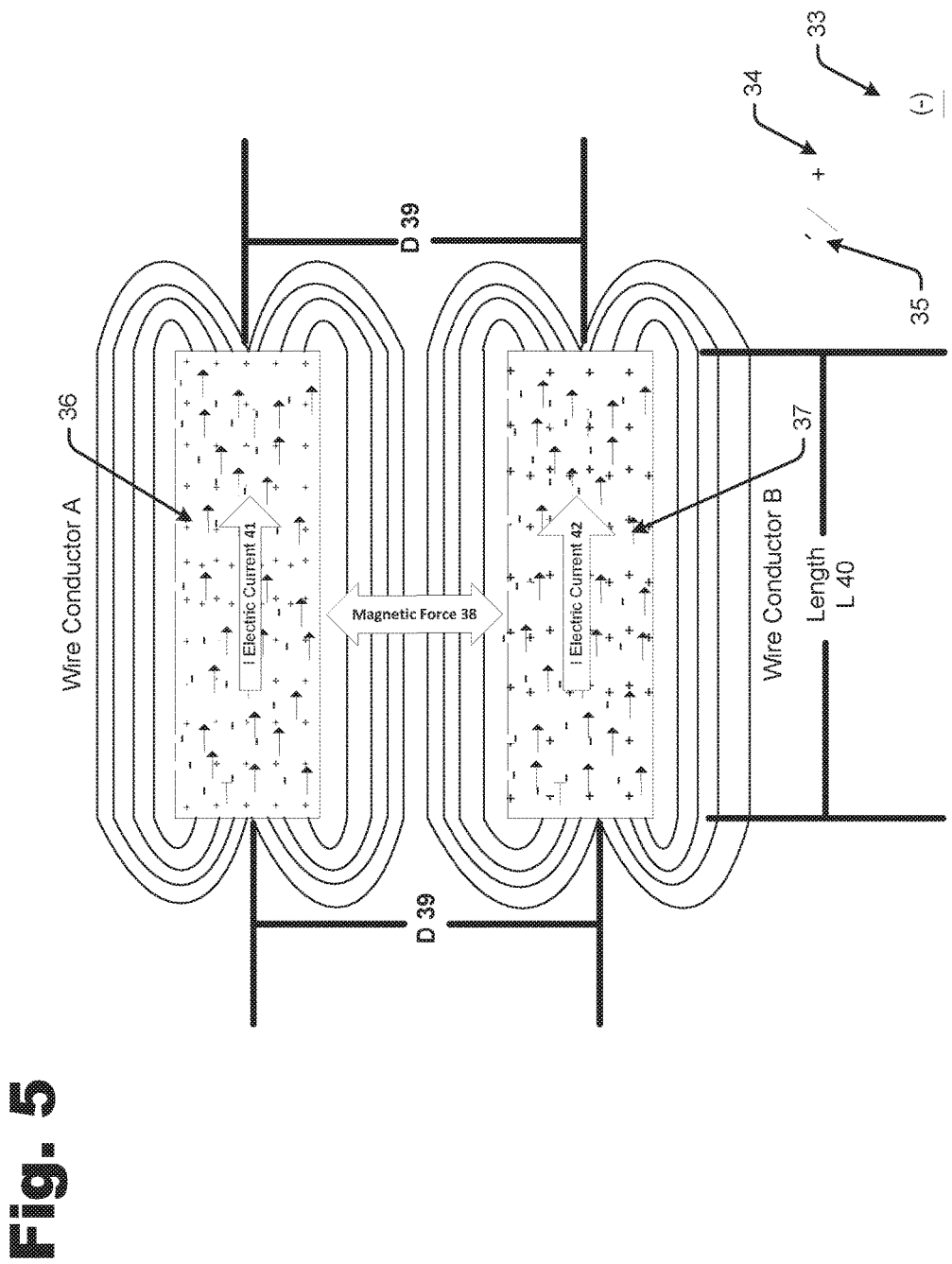

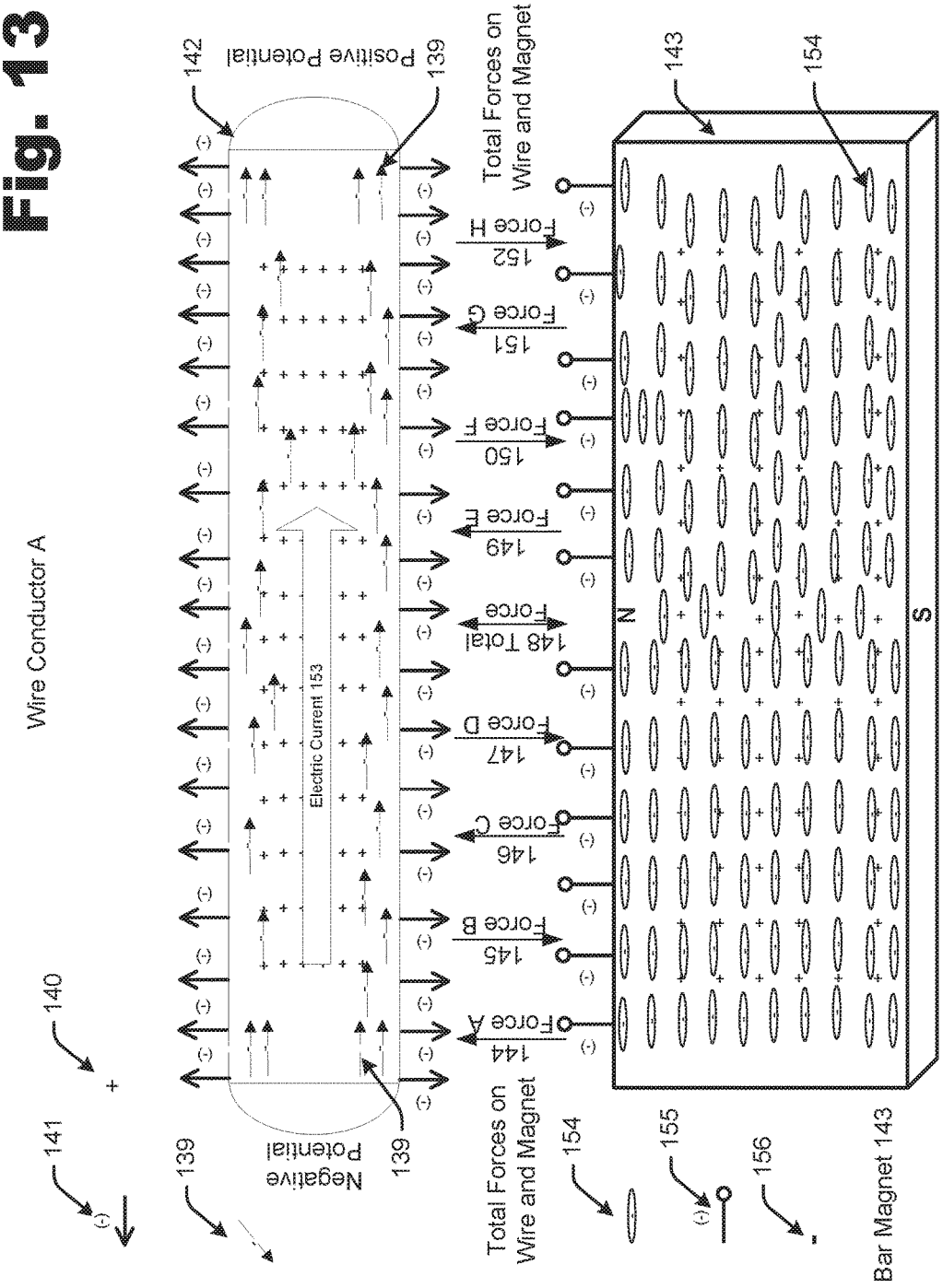

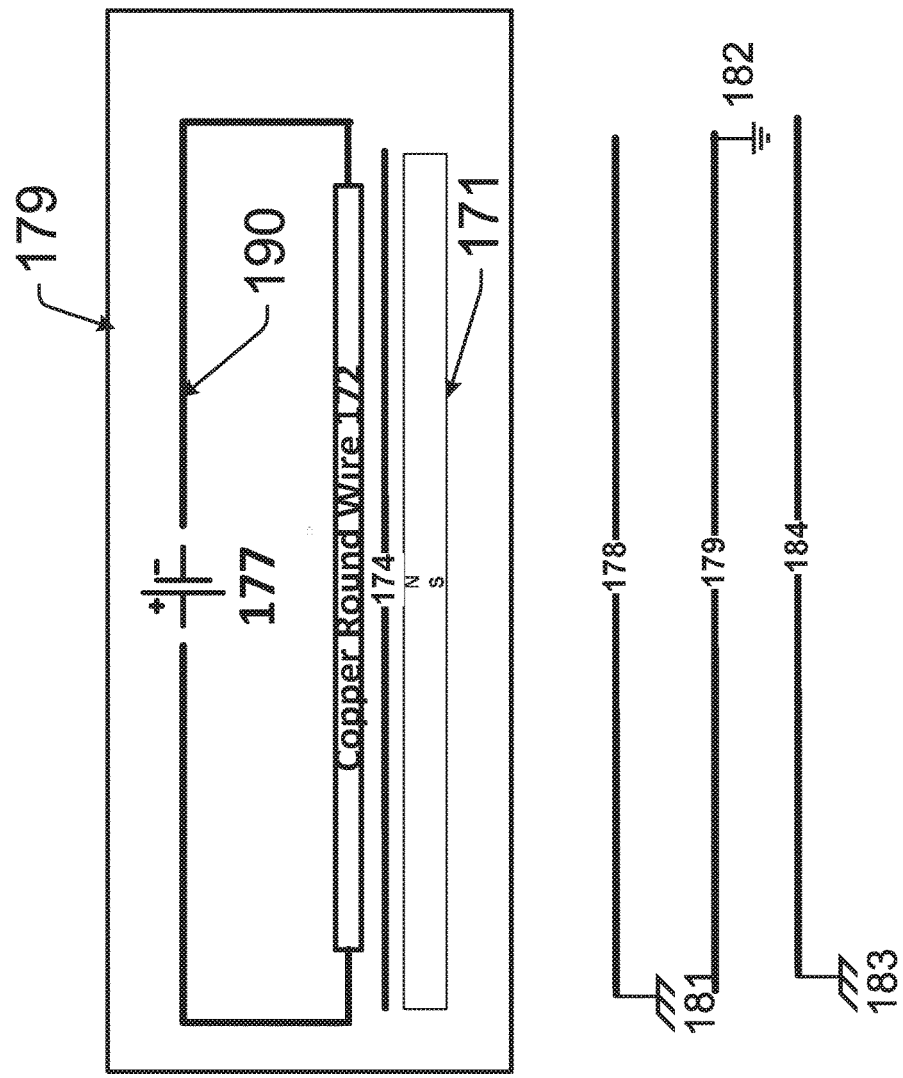

COMPLEX ELECTRIC FIELDS AND STATIC ELECTRIC FIELDS TO EFFECT MOTION WITH CONDUCTION CURRENTS AND MAGNETIC MATERIALS

BACKGROUND

Electromagnetics is a vector based mathematical framework used in physics and electrical engineering. This mathematical framework can be considered to have two coupled fields known as the magnetic field and electric field. This mathematical framework was originally formulated in the 1860's to treat these fields as separate independent fields.

These separate fields have been shown to be coupled together by James Maxwell through the mathematical construct of the complex-quaternion. Einstein demonstrated that the electric field was a primary field and the magnetic force that the magnetic field that was created to describe these magnetic forces was really the results of the interaction of electric fields from charges in two different inertial frames of references in a conductor or magnetic material. This has created a mathematical framework that now is incomplete at describing all the forces from charges in relative motion that can be exploited to effect motion.

BRIEF DESCRIPTION OF THE DRAWINGS

FIG. 5 illustrates a magnetic force between two conductors.

FIG. 13 illustrate the different forces that a plane of copper conductors and a block of magnetic material experience.

FIG. 15 illustrates an example electrical schematic of two planes of wire conductors with power supplies and shielding example.

DETAILED DESCRIPTION

Figure 1A:
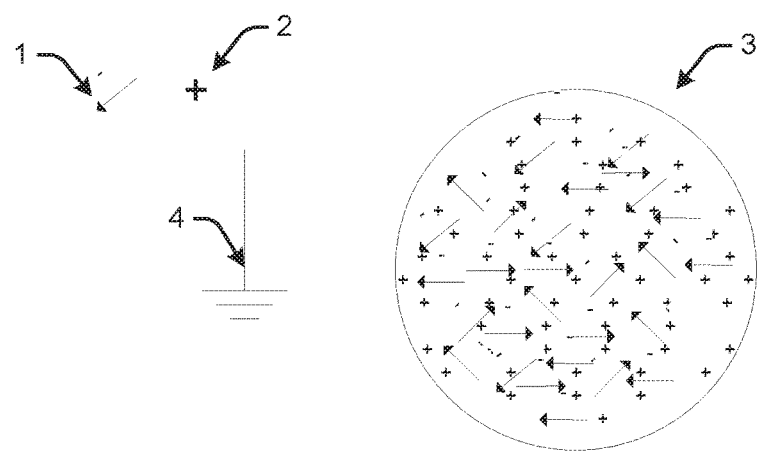
FIGS. 1A and 1B illustrate a wire conductor with no electric current, wherein (A) is a wire conductor end view, and (B) is a wire conductor side view.

Complex electric fields and static electric fields to effect motion with conduction currents is disclosed. In an example, a method of using interacting electric fields from charges in conductors or magnetic materials in different inertial reference frames to effect motion is disclosed. The example demonstrates a method of producing a force from an assembly of two conductors made of different materials that have different drift velocities for their mobile electric charges. The example method implements the mathematical framework that divides the electric fields from the charges in different inertial reference frames into separate electric field equations in electrically isolated conductors or magnetic materials. The example method then implements the interaction of these electric fields to produce a force on an assembly to propel a spacecraft using electricity without any propellant.

A second example replaces one set of conductors with a block of magnetic material with the magnetic moments aligned to create interacting electric fields materials in different inertial reference frames to effect motion is also disclosed. The second example method then implements the interaction of these electric fields to produce a force on an assembly to propel a spacecraft using electricity without any propellant.

Instead of using today's electromagnetic framework, the following equations can be implemented to effect motion from charges in different inertial reference frames.

Electric Field Equation:

$$\vec{E} = -\frac{\partial \vec{V}}{\partial t}\frac{\Phi}{c^2} - \nabla \times \frac{\vec{V}}{c}\Phi - \nabla\Phi \text{ Volts/Meter} \quad \text{(EQN 1)}$$

Scalar Electric Potential Equation:

$$S = \frac{\partial}{\partial t}\frac{\Phi}{c} + \vec{\nabla} \cdot \frac{\vec{V}}{c}\Phi \text{ Volts/Second} \quad \text{(EQN 2)}$$

This mathematical framework splits the electric fields from the electric charges in different inertial frames of references, into separate equations. To determine the forces between conductors or magnetic materials these two sets of two equations are then coupled together by the medium that the charges reside in to create a force equation.

The magnetic field can be derived from these two sets of equations to mathematically describe the magnetic field when these charges are flowing through the medium of a wire conductor or in magnetic materials. These frameworks can be implemented to effect motion from electric currents in conductors or magnets in ways that can be implemented for spacecraft propulsion with electric currents only.

Before continuing, it is noted that the examples described herein are provided for purposes of illustration, and are not intended to be limiting. Other devices and/or device configurations may be utilized to carry out the operations described herein.

It is further noted that as used herein, the terms "includes" and "including" mean, but is not limited to, "includes" or "including" and "includes at least" or "including at least." The term "based on" means "based on" and "based at least in part on."

Figure 1B:
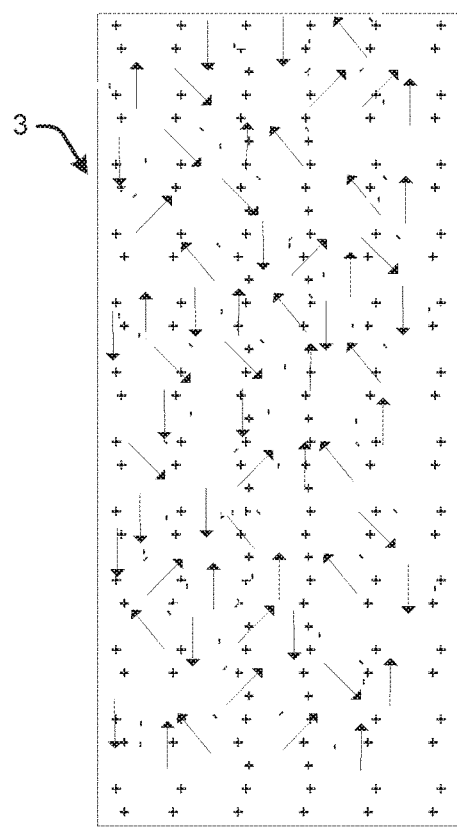

FIGS. 1A and 1B illustrate a wire conductor with no electric current, wherein (A) is a wire conductor end view, and (B) is a wire conductor side view. The moving negative electrons 1 and fixed positive charges 2 are illustrated in an uncharged wire conductor 3 with no electric current flowing through it. The wire conductor 3 has fixed atoms that have a static unpaired positive charge 2 from the unpaired proton that the mobile electron 1 leaves behind in copper that makes copper a conductor of an electric current. The unpaired positive charge 2 from the unpaired proton that is tightly coupled to the atomic structure of the wire conductor, while the mobile electron 1 is only coupled to the wire 3 by the electric charge of the wire 3 and the physical boundaries of the wire 3. In the inertial reference frame of the wire the positive charge 2 just has one term from the electric field equation (1) to describe its electric field that is represented by the protons static electric field.

Electric Field Equation for the Fixed Positive Charges 2 can be described as follows:

$$\vec{E} = +\nabla\Phi \text{ Volts/Meter} \qquad (EQN\ 3)$$

The mobile electrons 1 in a wire conductor 3 also have a static electric field that is modified by the effects of relativity. The electric field from these mobile electrons 1 is described mathematically by the electric field equation (1) as a static electric field that is modified by a Lorentz contracted term and a term to describe the acceleration of the electrons as they change direction in the wire 3.

$$\vec{E} = -\frac{\partial \vec{V}}{\partial t}\frac{\Phi}{c^2} - \nabla \times \frac{\vec{V}}{c}\Phi - \nabla\Phi \text{ Volts/Meter} \qquad (EQN\ 4)$$

In addition, there is also a scalar electric potential term from equation (2) that is observed as the electrons 1 approach and recede from an observer of the wire. The random movements of the mobile electrons in the stationary wire offset each other and do not modify the static electric field of the wire 3, except to create noise in the electric field.

$$S(\text{Receding}-) = +\vec{\nabla}\cdot\frac{\vec{V}}{c}\Phi \text{ Volts/Second} \qquad (EQN\ 5)$$

$$S(\text{Approaching}-) = -\vec{\nabla}\cdot\frac{\vec{V}}{c}\Phi \text{ Volts/Second} \qquad (EQN\ 6)$$

The result of the interactions of the electric fields from the stationary positive charges 2 electric fields and the electric fields from the mobile electrons 1 is to give the wire conductor 3 a slightly negative charge when the wire conductor 3 has an equal number of free electrons 1 to the unpaired protons 2 in the atoms. The static electric fields of the negative electrons 1 and the positive charges 2 from the unpaired protons follow the rules of superposition and sum to 0.

$$0 = +\nabla\Phi(\text{protons}) - \nabla\Phi(\text{electrons}) \text{ Volts/meter} \qquad (EQN\ 7)$$

The resulting electric field that is observed from the wire conductor is from changes to electric field of mobile electrons 1 from the effects of the Lorentz contraction of the negative electric charge 1.

$$\vec{E}(\text{Wire}) = -\nabla \times \frac{\vec{V}}{c}\Phi \text{ Volts/meter} \qquad (EQN\ 8)$$

Equation (8) increases the negative electric fields from the motion of the electrons 1 that are observed perpendicular to their motion and as such do not follow all the rules of superposition. The increase in the electric field from the moving electron 1 is from the effects of relativity from the Lorentz contraction that is observed from the moving electrons. This forces the negative charge density of the wire to be greatest near the outside of the wire and the ends of the wire.

The changes to the electric field equation for the free electrons 1 due to the acceleration of the electrons 1 are modeled by the following equation.

$$\vec{E}(\text{Wire}) = -\frac{\partial \vec{V}}{\partial t}\frac{\Phi}{c^2}\Phi \text{ Volts/meter} \qquad (EQN\ 9)$$

The electric field from equation (9) is observed from the electrons 1 as they change velocity inside the conductor 3 that is material and physical shape dependent.

The wire conductor 3 retains a negative charge 1 until the wire 3 comes in contact with the earth ground 4. Some of the negative charge 1 moves to earth ground 4 and the wire conductor 3 have a slight deficit in negative charge 2, to give it a neutral charge or no total electric field.

Figure 2:
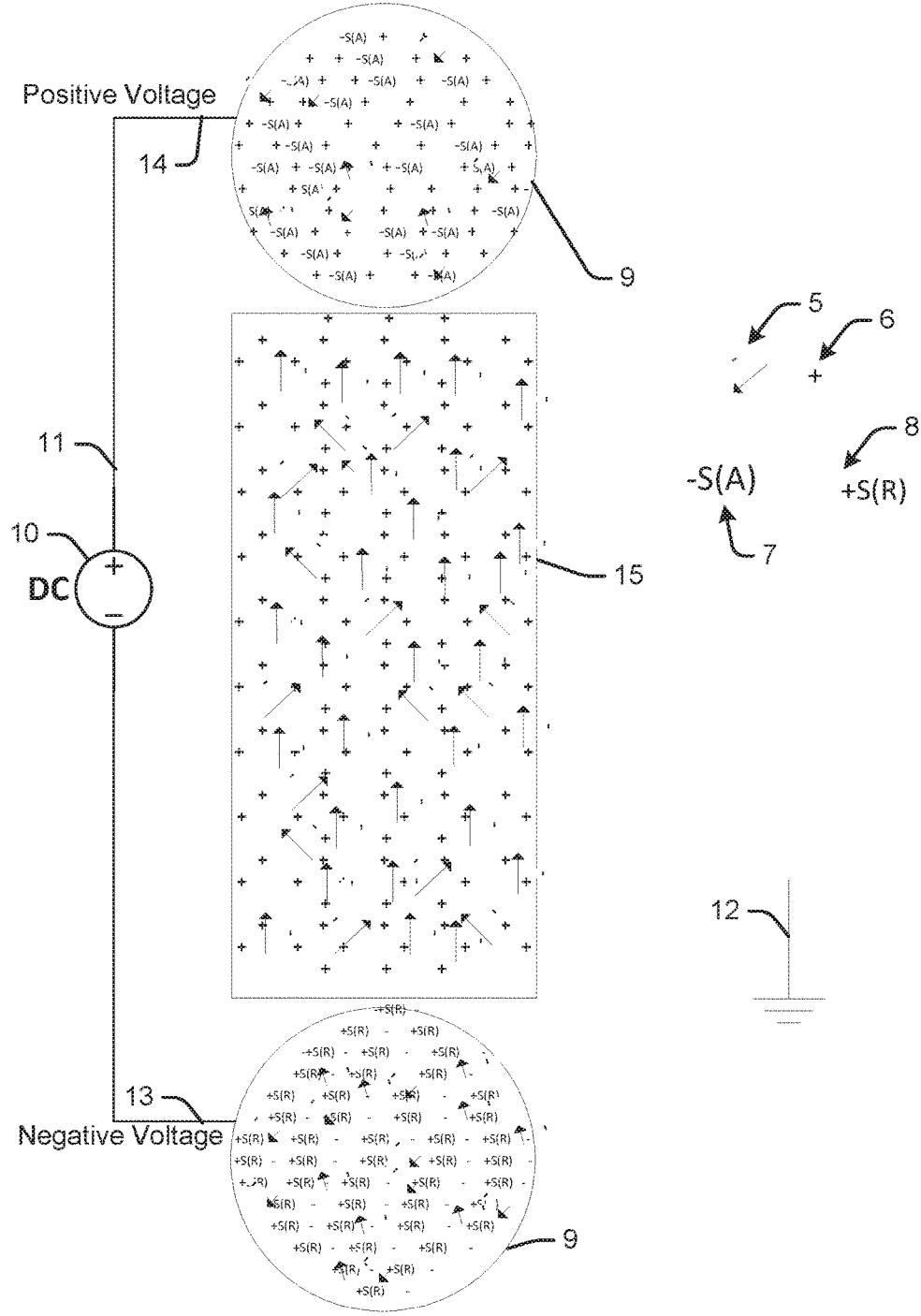
FIG. 2 illustrates a round wire with an electric current.

FIG. 2 illustrates the moving negative electrons 5 when a voltage source 10 is applied to the wire 9, 15 with the negative potential 13 on the bottom side of the wire 9 and a positive potential 14 is applied to the top side of the wire 9.

The side view of the wire 15 observes the electric field from the moving electrons 5 to increase from the effects of relativity, as the electrons drift to the positive end of the wire as an electric current. When the positive charge's 6 electric fields and the moving negative charge's 5 electric fields are coupled together inside of a wire conductor 15 the difference in the two charges electric fields are observed as the magnetic force that is described by the magnetic field using todays vector equations that were derived from Maxwell's equations.

The edge of the ends of the wire 9 allow the receding +S(R) 8 and approaching −S(A) 7 scalar potential to be observed as a decrease and increase in the electric field at the ends of the wire that can be measured with a static electric field meter.

Figure 3A:
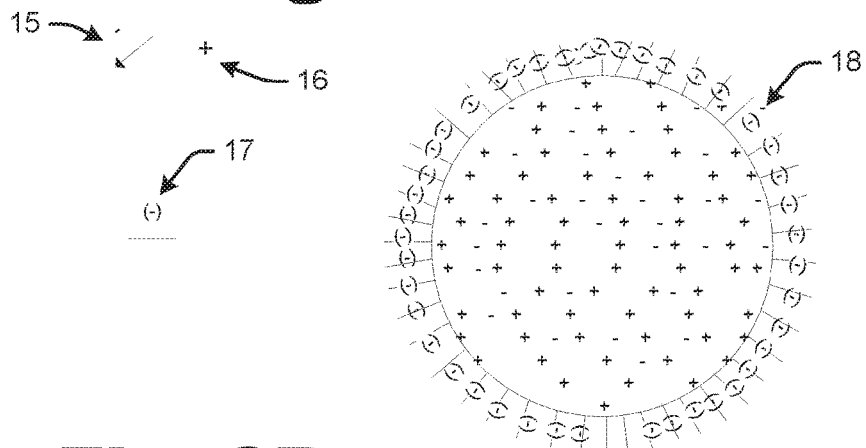
FIGS. 3A and 3B illustrate an electric field from a round wire with an electric current, wherein (A) is a wire conductor end view, and (B) is a wire conductor side view.
Figure 3B:
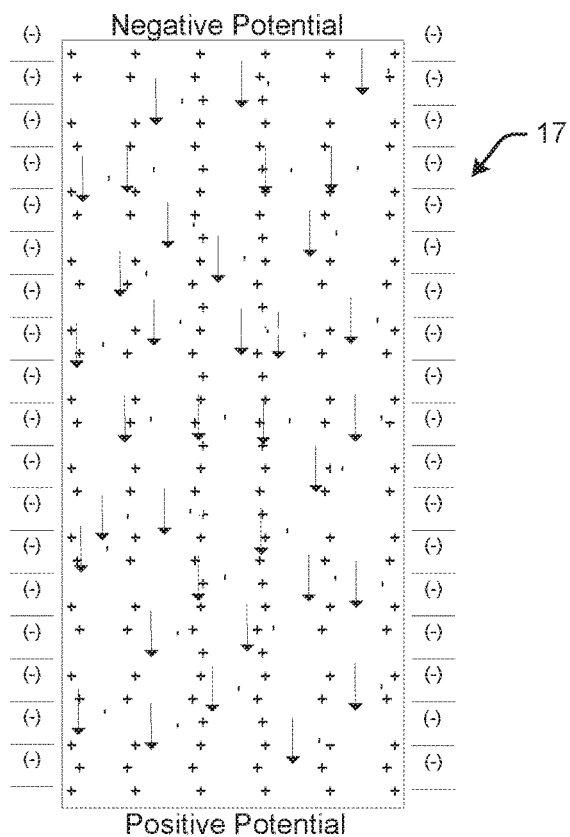

FIGS. 3A and 3B illustrate an electric field from a round wire with an electric current, wherein (A) is a wire conductor end view, and (B) is a wire conductor side view. The moving negative electrons 15 electric field change 17 are illustrated from their motion from a round wire 18. The total electric field is composed of the static electric field 16 from the fixed positive charges represented by equation (10).

$$E(+) = +\nabla \Phi \frac{\text{Volts}}{\text{meter}} \qquad \text{(EQN 10)}$$

The electric fields from the negative electrons that compose the electric current are represented by equation (11).

$$\vec{E}(-) = -\nabla \times \frac{\vec{V}}{c} \Phi - \nabla \Phi \frac{\text{Volts}}{\text{meter}} \qquad \text{(EQN 11)}$$

The electric fields from the two different charges follow a subset of the rules of superposition due to the charges being physically coupled together in the stationary wire and sum together as represented by equation (12).

$$\perp = \text{Viewed perpendicular to the charges motion} \qquad \text{(EQN 12)}$$
$$\| = \text{Viewed parallel to the charges motion}$$
$$\vec{E}(\perp, \|) = +\nabla \Phi(\text{Positive}) - \nabla \Phi(\text{Negative}) \frac{\text{Volts}}{\text{meter}}$$

The resulting difference electric field 17 is observed outside the wire 18 when the wire is viewed perpendicular to the electric current direction, and is represented by equation (13).

$$\vec{E}(\perp) = -\nabla \times \frac{\vec{V}}{c} \Phi \frac{\text{Volts}}{\text{meter}}, \ \vec{E}(\|) = 0 \qquad \text{(EQN 13)}$$

The resulting electric field 17 that is observed from the wire is the electric field component that produces the magnetic field from a wire. Conversion of the resulting electric field 17 to a magnetic field is illustrated by equations (14), (15), (16), and (17).

$$\Phi = \frac{\text{Charge}}{4\pi\varepsilon_o r^2} \text{ Volts}, \ \vec{A} = \frac{\mu_o \vec{I}}{4\pi} \text{ Amperes}, \ \mu_o = 1/(\varepsilon_o c^2) \qquad \text{(EQN 14)}$$

The equations (14) define the spherical charge and the electric current 15 from that spherical charge as Amperes. These equations are coupled together by the constants $u_0$ and $\varepsilon_0$ through the speed of light "c".

$$\vec{I} = \text{Charge} \frac{\text{Coulombs}}{\text{Seconds}} \text{ or Amperes} \qquad \text{(EQN 15)}$$

The equation (15) is the definition of the electric current 15 as a spherical charge flowing through a two-dimensional area of a round conductor.

$$-\nabla \times \frac{\vec{V}}{c} \Phi \frac{\text{Volts}}{\text{meter}} = -\nabla \times \frac{\vec{V}}{c} \left( \frac{\text{Charge}}{4\pi\varepsilon_o r^2} \right) = \left[ \frac{\mu_o \vec{I}}{4\pi} \frac{1}{\varepsilon_o c^2} \right] = \vec{A} \qquad \text{(EQN 16)}$$

Equation (16) converts the difference electric field 17 from the moving charge into the magnetic potential that is created from a spherical charge flowing through a round wire 18 as an electric current 15.

$$\vec{B} = \nabla \times \vec{A} \text{ Volt} \cdot \frac{\text{Second}}{\text{Meter}} \text{ or Tesla} \qquad \text{(EQN 17)}$$

Equation (17) converts the magnetic vector potential to the magnetic field. But the conversion is based on the properties of a copper wire conductor 18 that is just a special case that is not valid if these physical properties or material that the electric current flows through is different.

Figure 4:
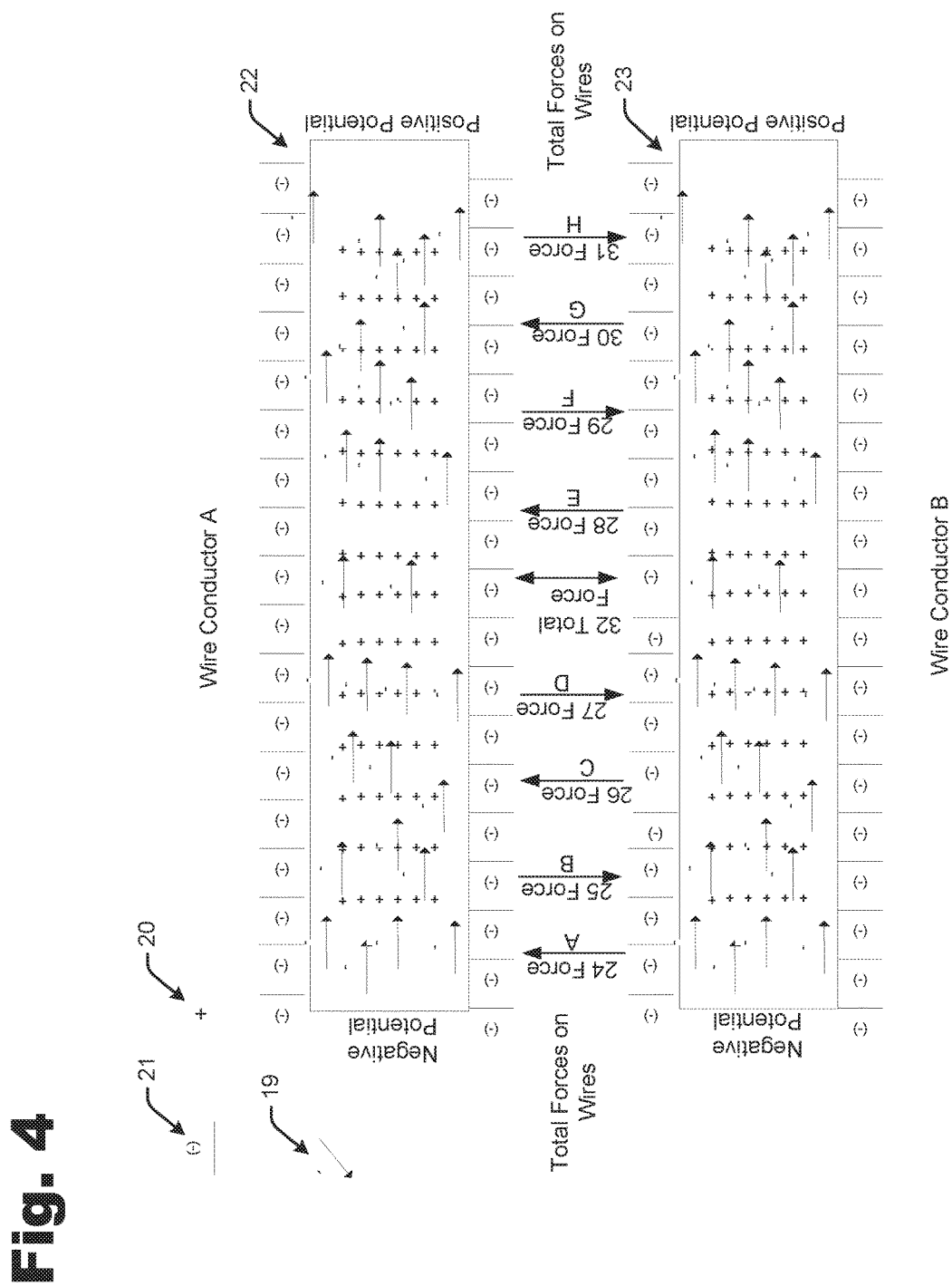
FIG. 4 illustrates an electric force between two round conductors with an electric current.
Figure 6A:
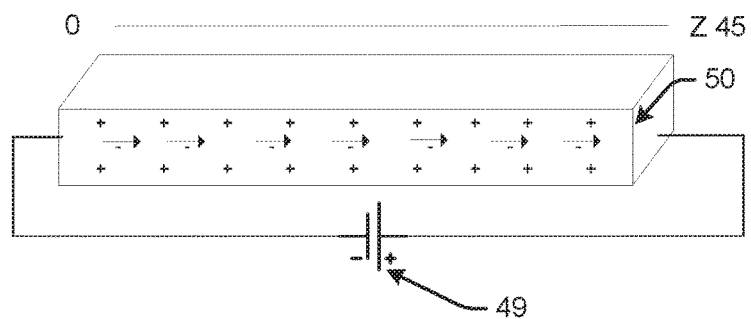
FIGS. 6A, 6B, 6C and 6D illustrate square conductors having an electric field with a current, wherein (A) is a square conductive wire with an electric current with flat faces, (B) is a square wire end view, (C) is a square wire side view, and (D) is a round wire end view.
Figure 6D:
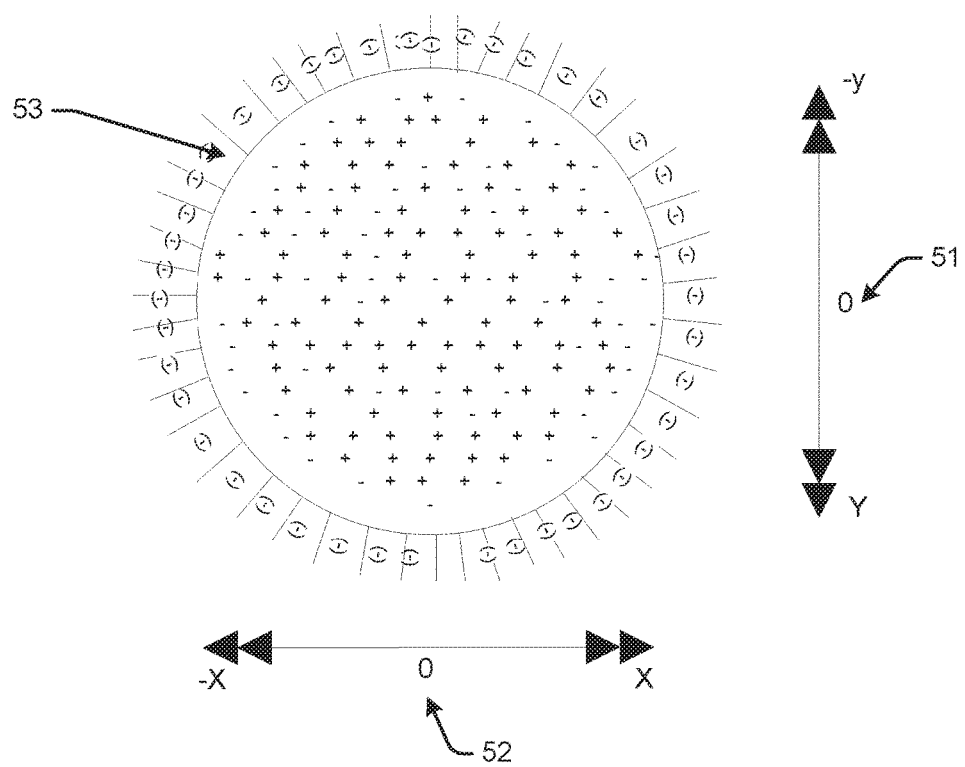
Figure 6B:
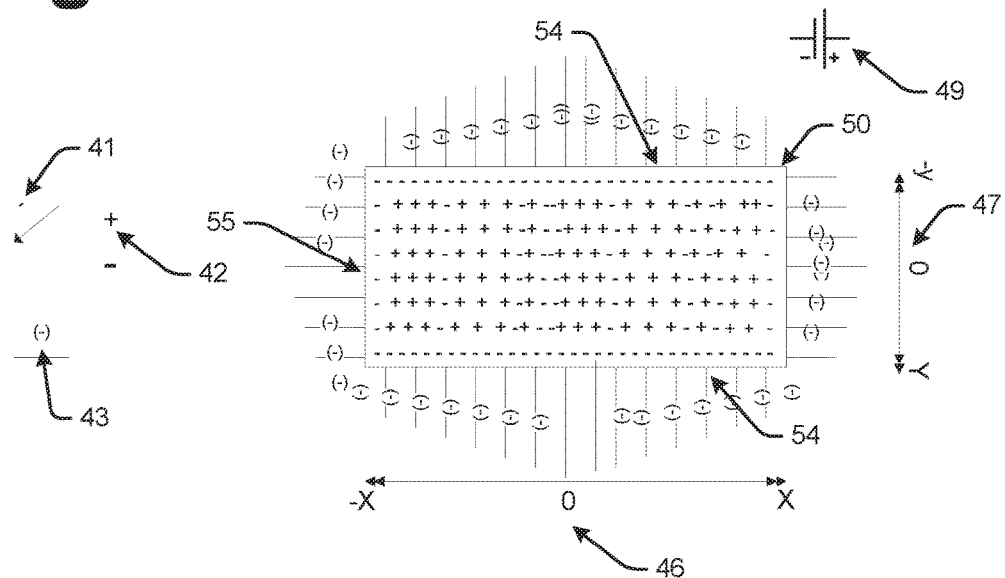
Figure 6C:
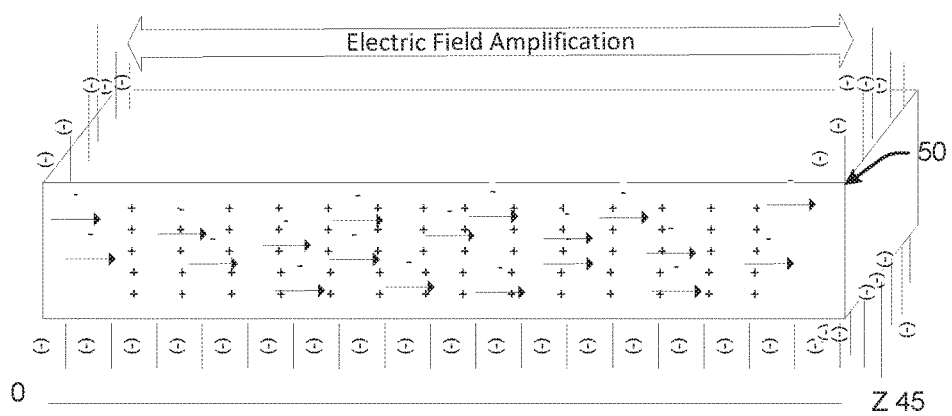

FIG. 4 illustrates mathematically the relativistic electric field 21 interactions between two wire conductors 22, 23 with an electric current 19 that are in close proximity of each other. The moving negative 19 charges interact with the positive stationary positive charges 20 in the wires to produce a force 32 between these wires.

When Wire A 22 has an electric current 19 flowing through it that produces a positive electric field from the stationary positive charges 20 and a negative electric field 21 from the moving negative charges 19. Wire B 23 has the same two types of electric fields. These electric fields are in two physical objects 22, 23 of the same material and shape, so a subset of the rules of superposition mathematically extract a set of magnetic forces that can be modeled in the mathematical framework that describes the magnetic force from a magnetic field.

If the resulting force on the wires 32 is determined from the interactions of these different electric fields, instead of using the framework based on the magnetic field, we have a framework that describe the forces observed from conductors 22, 23.

Determining forces on these wires allow us to take into account the materials and shape of the wires to determine the total forces on the wires.

Total force on wire A 22 can be described by four electric field interactions with wire B 23 that produces four forces on wire A as separate forces 24, 25, 26, 27 that can be represented as:

$$\vec{F_A} + \vec{F_B} + \vec{F_C} + \vec{F_D} = \text{Total force on wire } A \qquad \text{(EQN 18)}$$

Repulsive force on Wire A 22 from the electric field interactions from the positive charges in wire A 22 with the positive charges in wire B 23 can represented as:

$$\vec{F_A} = \vec{F} \ [\vec{E}_{\text{Wire } A}(+) <=> \vec{E}_{\text{Wire } B}(+)] \qquad \text{(EQN 19)}$$

Attractive force on Wire A 22 from the electric field interactions from the positive charges in wire A 22 with the moving negative charges in wire B 23 can represented as:

$$\vec{F_B} = \vec{F} \ [\vec{E}_{\text{Wire } A}(+) >=< \vec{E}_{\text{Wire } B}(-)] \qquad \text{(EQN 20)}$$

Repulsive force on Wire A 22 from the electric field interactions from the moving negative charges in wire A 22 with the moving negative charges in wire B 23 can represented as:

$$\vec{F_C} = \vec{F} \ [\vec{E}_{\text{Wire } A}(-) <=> \vec{E}_{\text{Wire } B}(-)] \qquad \text{(EQN 21)}$$

Attractive force on Wire A 22 from the electric field interactions from the moving negative charges in wire A 22 with the positive charges in wire B 23 can represented as:

$$\vec{F_D} = \vec{F} \ [\vec{E}_{\text{Wire } A}(-) >=< \vec{E}_{\text{Wire } B}(+)] \qquad \text{(EQN 22)}$$

Then the total force on wire B 23 is described by four electric field interactions with wire A 22 that produces 4 separate forces 28, 29, 30, 31 on wire B 23 that can be represented as:

$$\vec{F_E} + \vec{F_F} + \vec{F_G} + \vec{F_H} = \text{Total force on wire } B \qquad \text{(EQN 23)}$$

Repulsive force on Wire B 23 from the electric field interactions from the positive charges in wire A 22 with the positive charges in wire B 23 can represented as:

$$\vec{F_E} = \vec{F}[\vec{E}_{Wire\,B(+)} <=> \vec{E}_{Wire\,A(+)}] \quad \text{(EQN 24)}$$

Attractive force on Wire B 23 from the electric field interactions from the positive charges in wire A 22 with the moving negative charges in wire B 23 can represented as:

$$\vec{F_F} = \vec{F}[\vec{E}_{Wire\,B(+)} >=< \vec{E}_{Wire\,A(-)}] \quad \text{(EQN 25)}$$

Repulsive force on Wire B 23 from the electric field interactions from the moving negative charges in wire A 22 with the moving negative charges in wire B 23 can represented as:

$$\vec{F_G} = \vec{F}[\vec{E}_{Wire\,B(-)} <=> \vec{E}_{Wire\,B(-)}] \quad \text{(EQN 26)}$$

Attractive force on Wire B 23 from the electric field interactions from the moving negative charges in wire A 22 with the positive charges in wire B 23 can represented as:

$$\vec{F_H} = \vec{F}[\vec{E}_{Wire\,B(-)} >=< \vec{E}_{Wire\,A(+)}] \quad \text{(EQN 27)}$$

Determining the forces on these wires as 8 separate force vectors allows these same forces to be modeled mathematically as a special case of a mathematical framework, with the simpler mathematical framework of a magnetic field with a magnetic force if the wires 22, 23 are made of the same shape and made of the same material. If the wires 22, 23 are of different shapes or made of different materials, the force on Wire A is different than the force on Wire B.

FIG. 5 illustrates mathematically the forces on two wires 36, 37 of the same shape and made of the same materials using the mathematical framework that physics has created to model magnetic forces from wire conductors 36, 37. The magnetic forces 38 that are described by these equations are based on $4\pi$ and the permeability constant in electromagnetics.

The total force on wire A 36 is determined by the equations:

$$\vec{F}_{Wire\,A} = \frac{\mu_o \vec{I_A} \vec{I_B}}{2\pi} \frac{2}{D} L_A \text{ Newtons, } \vec{I_A}\, 41, \vec{I_B}\, 42 \quad \text{(EQN 28)}$$

$L_x$ = Lenght of Wire 40 $D$ = Distance between Wires 39 (EQN 29)

The total force on wire B 37 is determined by the equation:

$$\vec{F}_{Wire\,B} = \frac{\mu_o \vec{I_A} \vec{I_B}}{2\pi} \frac{2}{D} L_B \text{ Newtons} \quad \text{(EQN 30)}$$

The total force between each of the wires 36, 37 is then:

$$38\, \vec{F}_{Total} = \vec{F}_{Wire\,A} + \vec{F}_{Wire\,B} \quad \text{(EQN 31)}$$

The total force on the wires is then:

$$38\, \vec{F}_{Total} = \frac{\mu_o \vec{I_A} \vec{I_B}}{2\pi D} L \text{ Newtons} \quad \text{(EQN 32)}$$

These forces 38 can be represented as interactions of electric fields from charges in different inertial reference frames that do not follow the rules of superposition.

The force on wire A 36 is:

$$\vec{F}_{Wire\,A} = -\nabla \times \frac{\vec{V_A}}{c}\left[\frac{\mu_o \vec{I_B}}{4\pi}\frac{1}{\varepsilon_o c^2}\right]\frac{2}{D}L_A = -\nabla \times \frac{\vec{V_A}}{c}\frac{Q_B}{4\pi\varepsilon_o r}\frac{2\vec{I_B}}{D}L_A \quad \text{(EQN 33)}$$

$$\vec{F}_{Wire\,A} = -\nabla \times \frac{\vec{V_A}}{c}\Phi_A \frac{2\vec{I_B}}{D}L_A \quad \text{(EQN 34)}$$

The force on wire B 37 is:

$$\vec{F}_{Wire\,B} = -\nabla \times \frac{\vec{V_B}}{c}\left[\frac{\mu_o \vec{I_A}}{4\pi}\frac{1}{\varepsilon_o c^2}\right]\frac{2}{D}L_B = -\nabla \times \frac{\vec{V_B}}{c}\frac{Q_A}{4\pi\varepsilon_o r}\frac{2\vec{I_A}}{D}L_B \quad \text{(EQN 35)}$$

$$\vec{F}_{Wire\,B} = -\nabla \times \frac{\vec{V_B}}{c}\Phi_B \frac{2\vec{I_A}}{D}L_B \quad \text{(EQN 36)}$$

For the forces from these equations to determine the forces observed from wire conductors 36, 37, the velocity of the charges is fixed at velocities in the range of 1 cm/sec that is for copper conductors.

The constants $\mu$ (Permeability) and $4\pi$ are derived from the shape of wire conductors 36, 37 and the characteristics of the copper conductor, similar to the drift velocity of 1 cm/sec that defines a constant. If wires materials are changed to a different material (e.g., Graphene, Nichrome, or a Superconductor), with different drift velocities for the negative charges, these materials may need a correction factor to determine the forces on these wires 36, 37 made of these different materials to determine the forces observed on these wires.

The shape is not represented in the mathematical framework based on the magnetic field that describe magnetic forces. The mathematical framework based on the magnetic field does not differentiate the forces observed from a cylindrical wire or a flat wire with the same amount of current for the same wire cross sectional area.

FIGS. 6A, 6B, 6C and 6D illustrate square conductors having an electric field with a current, wherein (A) is a square conductive wire with an electric current with flat faces, (B) is a square wire end view, (C) is a square wire side view, and (D) is a round wire end view. The figures illustrate graphically the relativistic changes in the electric field of a graphene conductive square wire 50 with flat faces that has an electric current. The negative electric current 41 is in a different inertial frame of reference than the positive charges 42 in the wire that results in a difference relativistic electric field 43 that has been represented by the mathematical framework as the magnetic field.

The mathematics that model the forces from a round wire 53 using the magnetic field predict that the square wire 50 with an electric current 41 experience the same magnetic force on the round wire 53 with the same electric current observed with the square wire 50.

Instead of representing the forces between a square wire 50 and a round wire 53 by using the magnetic field, the forces are determined as the interaction of two electric fields 43 from two different charges 42, 41 in two different inertial frames of reference in the two different physical objects 50, 53 interacting to produce the two forces on the objects.

We now have the difference relativistic electric fields 43 from the wires that do not follow all the rules of superposition that is the basis for the magnetic force. This allows the two wires to observe different electric fields that are different from a square wire 50 and round wire 53 that results in different forces observed by the round wire 53 as compared to the square wire 50.

The negative electric current that is flowing along the length 45 of the wire 50 from left to right along the Z axis 45. The moving negative charges 41 distribute themselves evenly on the flat faces 54, 55 of the wire 50 as represented as the X axis and Y axis 46, 47. The negative charges 41 distribute themselves evenly to keep the electric field in the wire at 0 in the moving reference frame of the negative charges 41.

The negative electric charges 41 are physically coupled to the stationary reference frame of the wire 50. Yet the electric field 43 of the negative moving charges 41 increase in intensity when observed perpendicular to their motion from the stationary reference frame due to the effects of relativity known as the Lorentz contraction of the charges.

The increase in the electric field 43 observed from the stationary reference frame of the wire from the motion of the negative electric charges 41, is geometrically amplified (e.g., similar to a uniform line charge amplified across its length). The equation for the electric field of a line charge is mathematically described below:

$L$ = Length of Uniformly Charged Wire in Meters $x$ = Position from center of Wire from $-\frac{L}{2}$ to 0 to $\frac{L}{2}$ Meters $D$ = Distance Perpendicular from Wire in Meters $y = \lambda_q$ = Charge Density in Coulombs/Meter $$E(x) = \frac{y}{2\pi\epsilon_o D}\left(\frac{L}{\sqrt{\left(D^2+\left(\frac{L}{2}\right)^2\right)}} - \frac{2x}{\sqrt{(D^2+x^2)}}\right) \text{ Volts/Meter} \quad \text{(EQN 37)}$$

The faces of the square wire 54, 55 experience geometric amplification of the electric field intensity increase 43 from the charges motion along the Z axis 45 that is perpendicular to the direction of the electric current on the X and Y 46, 47 axis's that is modeled as a line charge of a uniformly charged wire.

The integration of the line charge to get the electric field 43 produce an electric field that is greatest at the center of the faces of the flat wire 54, 55 that is perpendicular to the electric current direction.

$w_x, w_y$ = Width of Wire Faces 54, 55 in Meters
$x, y$ = Position from center of Faces 46, 47 in Meters
$D$ = Perpendicular Distance from face in Meters
$\hat{\lambda}_{iq}$ = Charge Density increase in Coulombs/Meter $$\hat{\lambda}_{iq} = -\nabla \times \frac{\vec{V}_z}{c}\lambda_q \text{ Volts/Meter} \quad \text{(EQN 38)}$$

$$E(x) = \frac{\hat{\lambda}_{iq}}{2\pi\epsilon_o D}\left(\frac{w_x}{\sqrt{\left(D^2+\frac{w_x^2}{2}\right)}} - \frac{2x}{\sqrt{(D^2+x^2)}}\right)\frac{\text{Volts}}{\text{Meter}} \quad \text{(EQN 39)}$$

$$E(y) = \frac{\hat{\lambda}_{iq}}{2\pi\epsilon_o D}\left(\frac{w_y}{\sqrt{\left(D^2+\frac{w_y^2}{2}\right)}} - \frac{2y}{\sqrt{(D^2+y^2)}}\right)\frac{\text{Volts}}{\text{Meter}} \quad \text{(EQN 40)}$$

The round wire 53 does not experience this amplification of the electric field 43 around the circumference of the wire. Instead, the increase of the electric field due to the charges motion are only described by the equation:

$$E(x) = \frac{-\nabla \times \frac{\vec{V}_z}{c}\lambda_q}{2\pi\epsilon_o D}\frac{\text{Volts}}{\text{Meter}} \quad \text{(EQN 41)}$$

These differences in the electric fields from these different relativistic electric fields for a round wire 53 and a square wire 50 can create a difference force that can be implemented to propel a spacecraft in space as one application.

The requirements to produce different forces the two different wires are that the wires have to have different shapes and/or made of different materials with different drift velocities and/or charge distributions and powered by two separate electrically isolated power sources.

The moving electric charges that are the electric current are in different inertial reference frames. The reason is the electric fields from charges in the same inertial reference frame follow the rules of superposition. Electric fields from charges in different inertial reference frames do not follow the rules of superposition. The difference is the basis for the magnetic field from conductors flowing electric currents.

Figure 7A:
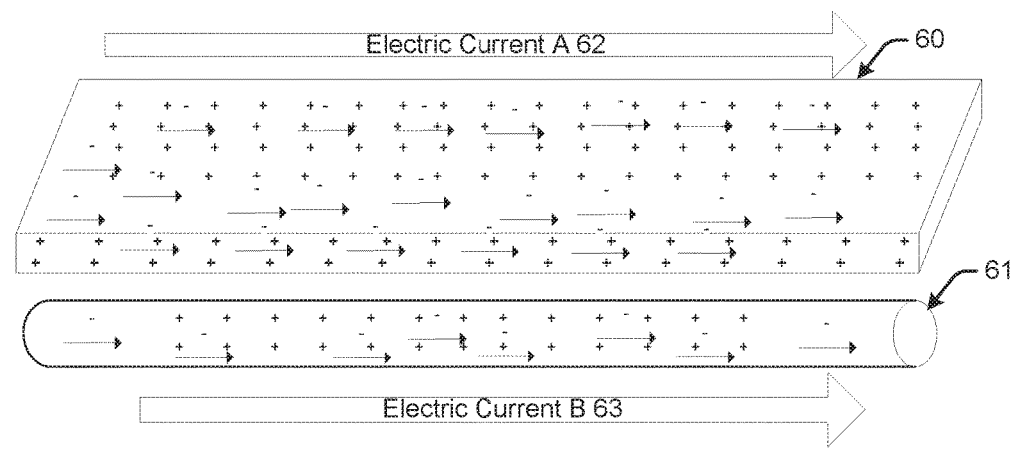
FIGS. 7A and 7B illustrate interacting electric fields from two conductors, wherein (A) is a wire conductor side view, and (B) is a wire conductor end view.
Figure 7B:
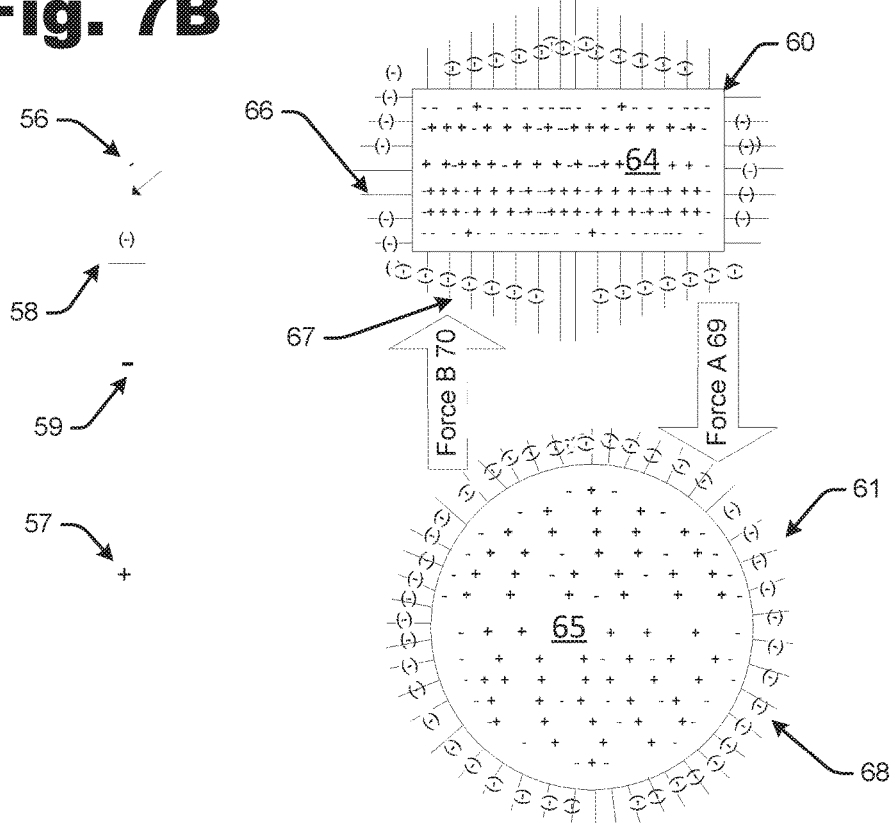

FIGS. 7A and 7B illustrate interacting electric fields from two conductors, wherein (A) is a wire conductor's side view, and (B) is a wire conductor's end view. In FIG. 7A, a square conductive graphene wire with flat faces and a tubular copper wire are shown flowing an electric current. In FIG. 7B, Force A 69 is unequal to Force B 70.

The figures illustrate two parallel wires 60, 61 with an electric current 62 in a square wire 60 that is parallel to a round copper wire 61 with an electric current 63. The end view of the wires 64, 65 shows the electric fields from charges 56, 57 moving at different drift velocities or in different inertial reference frames. If the wires 64, 65 had the same drift velocities the difference electric fields for the charges in the same inertial reference frame obey the rules of superposition and merge into one electric field. Since the charges drift velocity is different for graphene and copper the difference electric fields 66, 67, 68 from the wires 60, 61 do not follow the rules of superposition. Instead the rules of superposition are only valid for the electric fields from charges in the same inertial reference. This results in the positive charges 57 in the two wires 60, 61 observing two different total electric fields 66, 67, 68 from the other wire. This causes the forces 69, 70 that the two wires to observe from each other to be different.

Figure 8A:
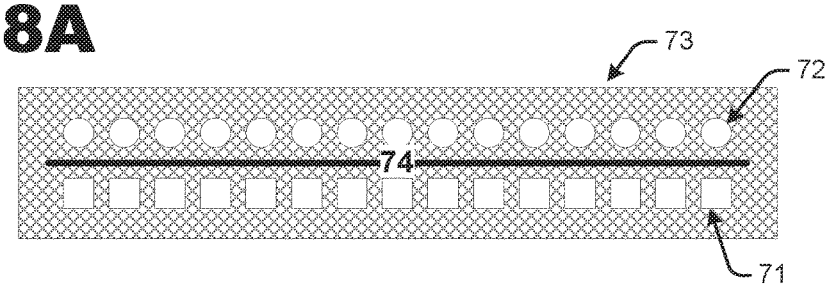
FIGS. 8A, 8B and 8C illustrate a cutaway view of an example assembly of two planes of wire conductors with power supplies and wiring diagram, wherein (A) is an edge view of the wires in a non-conductive frame, (B) is a top view of round wires in a non-conductive frame, and (C) is a top view of square wires in a non-conductive frame.
Figure 8B:
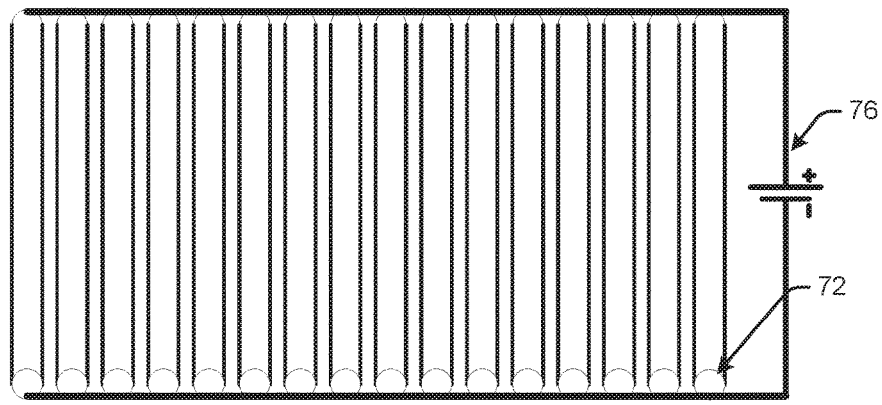
Figure 8C:
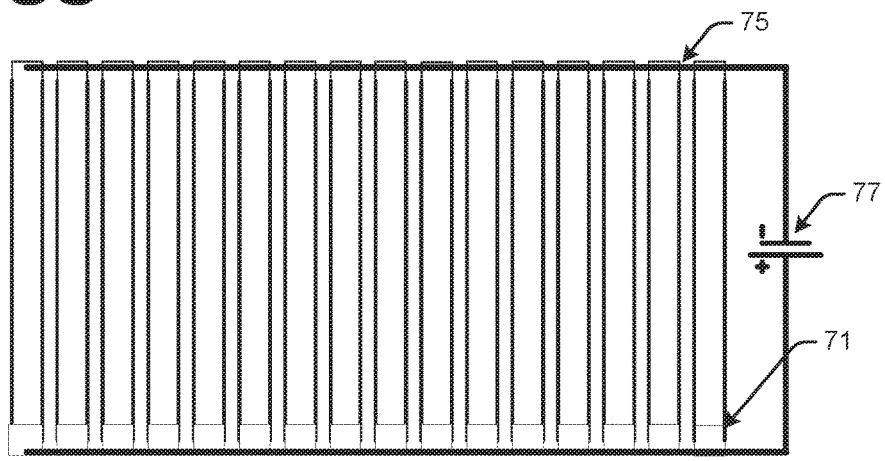

FIGS. 8A, 8B and 8C illustrate a cutaway view of an example assembly of two planes of wire conductors with power supplies and wiring diagram, wherein (A) is an edge view of the wires in a non-conductive frame, (B) is a top view of round wires in a non-conductive frame, and (C) is a top view of square wires in a non-conductive frame. The figures illustrate graphically an edge view of a sheet of square of round copper wires 72 and square wires 71 with flat faces made of two different materials in a nonconductive frame 73. The round copper wires 72 and square graphene wires 71 are electrically isolated from each other by a non-conducting sheet 74 as an example of a sheet of Kapton.

The wires are powered by electrically isolated power supplies 76, 77. The physical diagram and schematic of the top sheet of the wires 78 diagrams the wires being powered in parallel by power supply 76. The schematic of the bottom sheet of the wires 75 diagrams the wires being powered in parallel by power supply 77 with the electric current flowing in the opposite direction as the top sheet.

Figure 9:
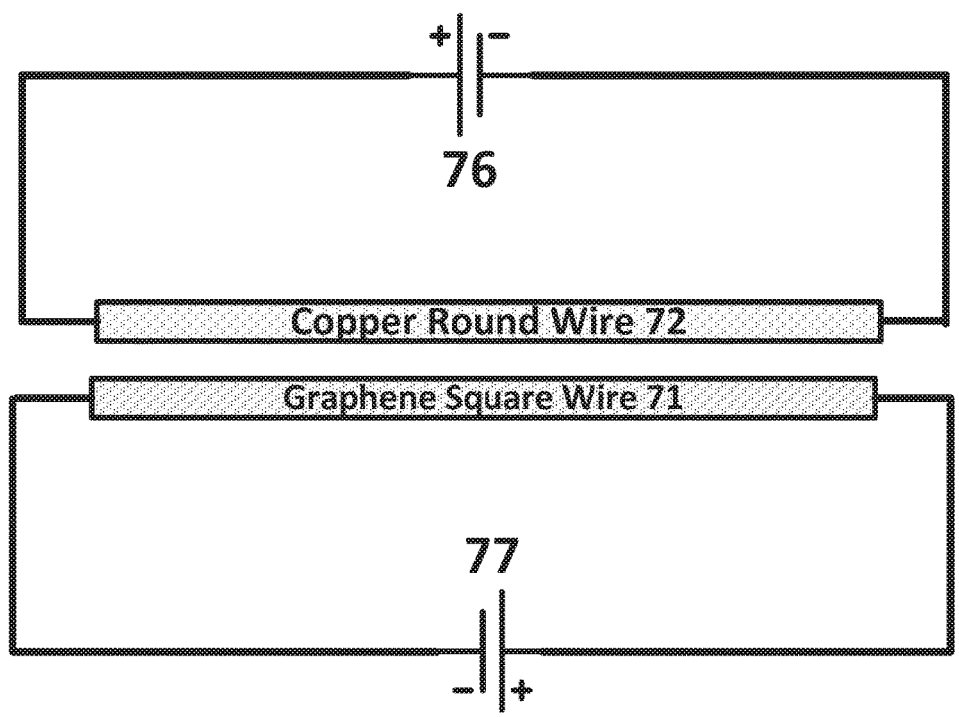
FIG. 9 illustrates an example electrical schematic of two planes of wire conductors with power supplies

FIG. 9 illustrates the electrical schematic of the electrical circuit that powers the two sheets of conductors 72, 71. The copper wires 72 and graphene wires 71 are powered by separate electrically isolated power supplies 76, 77. The electric currents from the battery 76 that supplies electric current to the round copper wires 72 is physically in the opposite direction from the electric current from battery 77 that supplies the electric current to the graphene wires 71. The electric currents from the battery 76 that supplies electric current to the round copper wires 72 can also be in the same direction as the electric current from battery 77 that supplies the electric current to the graphene wires 71 to create different opposite forces on the wires 72 and 71.

Figure 10:
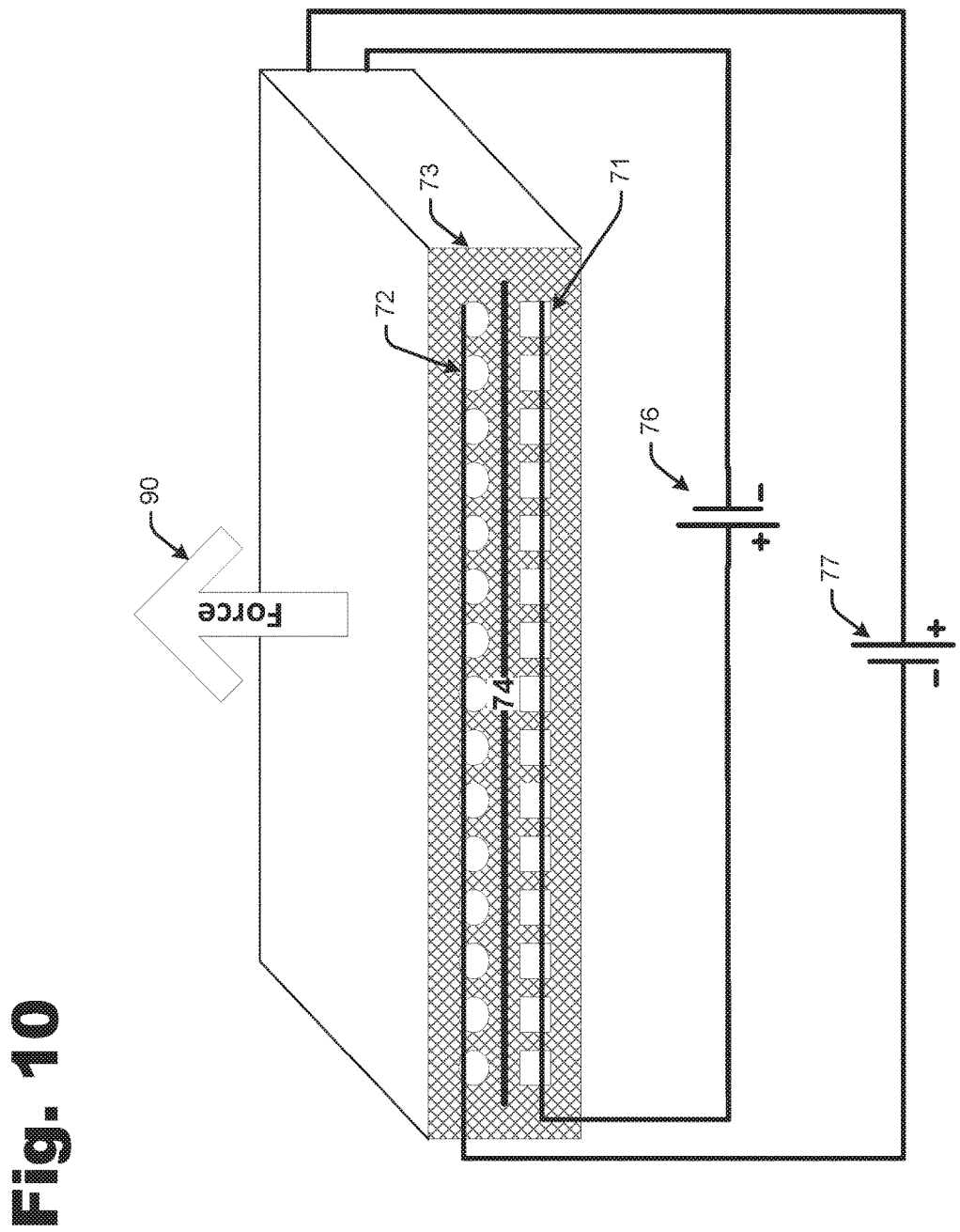
FIG. 10 illustrates an example assembly that is powered producing an external force.

FIG. 10 illustrates an assembly 73 with an electric current in two different directions from two isolated batteries 76, 77 through two different wire conductors 71, 72. The two planes of conductors have different electric fields from the motions of the electrons in wires that do not follow the rules of superposition such that the wires observe different electric fields from the other sheet of wires.

These two different electric fields result in different forces to be observed from the two sheets of wires 71, 72. This then results on a force 90 on the assembly that only requires the assembly to be powered by two isolated by independent power supplies.

The power supplies that power the conductors have to be physically and electrically isolated from each other. The conductors must have no external connections to ground or any conductor that connects to an external object outside the assembly. The conductors cannot connect to ground or together after they are powered through another conductor.

The round tubular wire 72 can be replaced with other types of wire shapes that do not geometrically amplify or geometrically amplify on different surfaces the electric changes electric fields due to relative motion of the charge carriers like conductive spheres or half spheres, conductive ovals, conductive u shaded wires or thin flat wires that are perpendicular to the flat faces of the square wires. The square wires can be replaced with thin flat wires that have their flat faces near the round or tubular wires.

The resulting force 90 can be implemented to propel spacecraft using electricity only. The same force can also be implemented for any propulsion by a force to move an object with electricity in a vacuum or in any medium.

It is noted that the examples shown and described are provided for purposes of illustration and are not intended to be limiting. Still other examples are also contemplated.

Figure 11C:
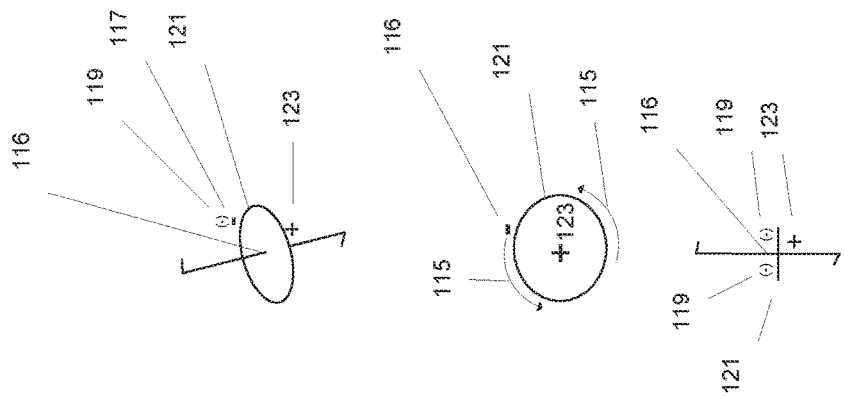
FIGS. 11A-C illustrate a relativistic field difference from the charges in a magnetic material with aligned magnetic moments.
Figure 11A:
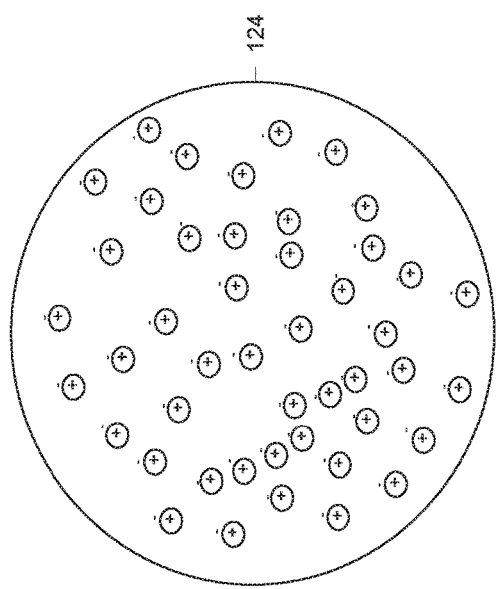
Figure 11B:
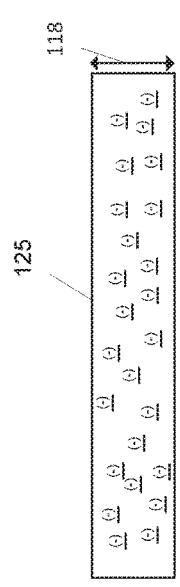

FIGS. 11A, 11B and 11C illustrate a magnetic material shaped as a cylinder 124, 125 with no electric current, wherein (A) is the end view, (B) is a side view of the magnetic material and (C) is a representation of the magnetic moment 116 of an atom 116, 117, 119, 121, 123 from an angled view, top view, and side view of the unpaired electron 117 and its electron current 115 and 121 that makes up the magnetic moment 116 from the negative electrons 117 in the outer shell of the atom and its associated positive charge 123 in the atom. The diagram assumes that the material has been magnetized to allow some of the molecules magnetic moments 116 to be aligned in line with the long axis of the cylinder 118.

The magnetic moments 116 of the molecules can be generated from the electron current 115 of the unpaired electron spins from the negative electrons 117 in the outer shell of the atom that can form a loop of electric current 115. The paired electrons in an atom have their spins in opposite directions that are represented as an up and down spin that allow the electric field changes to offset each other in their electron shell and do not contribute to the magnetic moment 116 of the atom. The physically fixed positive charge 123 that are paired or coupled to outer unpaired electron 117 are illustrated in an uncharged magnetized cylinder 124 and 125 with no electric current flowing through it.

The physically coupled positive charges 123 of the atom that are paired with the magnetic moment electrons 121 have a static electric field that can be modeled by the following equation when viewed from the inertial frame of reference of the magnet.

$$E(+) = +\nabla \Phi \frac{\text{Volts}}{\text{Meter}} \qquad \text{(EQN 42)}$$

The unpaired electron spins of the negative electrons 117 can be simply modeled as a loop of electric current 121 with a velocity 115 of 20,000 M/S. Each of the individual loops of current 121 from the motion of the negative electrons 117 have an electric field 119 modified by the effects of relativity from the Lorentz contraction of the electric charge that can be modeled by the following equation when viewed from the inertial frame of reference of the magnet.

$$\vec{E} = -\nabla \times \frac{\vec{V}}{c} \Phi - \nabla \Phi \frac{\text{Volts}}{\text{Meter}} \qquad \text{(EQN 43)}$$

Equation (43) increases the negative electric field 119 from the motion of the electrons 115 that are observed perpendicular to their motion and as such do not follow all the rules of superposition for all views. When the loop of electric current 121 is viewed perpendicular to the faces of the loops of current 121 of the magnetic moments of the atoms with aligned magnetic moments in the magnet, the total electric fields 119 from the electrons unpaired electron spins and their associated positive charges 123 will have total electric field 119 that is described by the following equation.

$$\vec{E} = -\nabla \times \frac{\vec{V}}{c} \Phi - \nabla \Phi + \nabla \Phi = -\nabla \times \frac{\vec{V}}{c} \Phi \frac{\text{Volts}}{\text{Meter}} \qquad \text{(EQN 44)}$$

The increase of the electric field from the negative electric field 119 from the motion 115 of the electrons 116 is 10,000 s of times greater than from a similar electric current in a copper wire. The total difference electric field 119 from the electrons 117 and the positive charges 123 that is observed from the faces of the magnet is going to be different than the magnetic field from an electric field from a wire conductor.

The total difference electric field 119 from the electrons 117 and the positive charges 123 that is observed from the edge of loops of current 121 of the magnetic moments of the atoms now is modeled differently than that is observed from the faces loops of current 121. The relative motion of the electrons 117 are in opposite directions 115 when viewed from the edge of the loop of current 121 so do not follow the same limited set of rules of superposition that the faces can follow and can sum to 0 when modeling magnetic forces that the magnetic field was created to describe.

The difference electric field 119 will be described from the 3-dimensional integral of total difference electric field from the shape of the magnet 124 and 125. The face of the magnet 124 and 125 is going to have a 2-dimensional surface integral that is the same as the surface integral that would be done for a uniformly charged flat disk. Since the disk are circular and that the electric field increase is only perpendicular to their motion this creates a symmetry that allows us to use a simpler line integral.

$$\vec{E} = kx\pi\varepsilon_0 \left[\frac{\vec{V}}{c} \times \Phi\right] \int_0^R \frac{2ada}{(x^2 + a^2)^{3/2}} = \quad \text{(EQN 45)}$$

$$kx\pi \left[\frac{\vec{V}}{c} \times \Phi\right] \left[\frac{1}{2(x^2 + a^2)^{\frac{1}{2}}}\right]_0^R \frac{\text{Volts}}{\text{Meter}}$$

$$\vec{E} = 2\pi\varepsilon_0 \left[\frac{\vec{V}}{c} \times \Phi\right] \left(1 - \frac{x}{(x^2 + R^2)^{1/2}}\right) \frac{\text{Volts}}{\text{Meter}} \quad \text{(EQN 46)}$$

Figure 12:
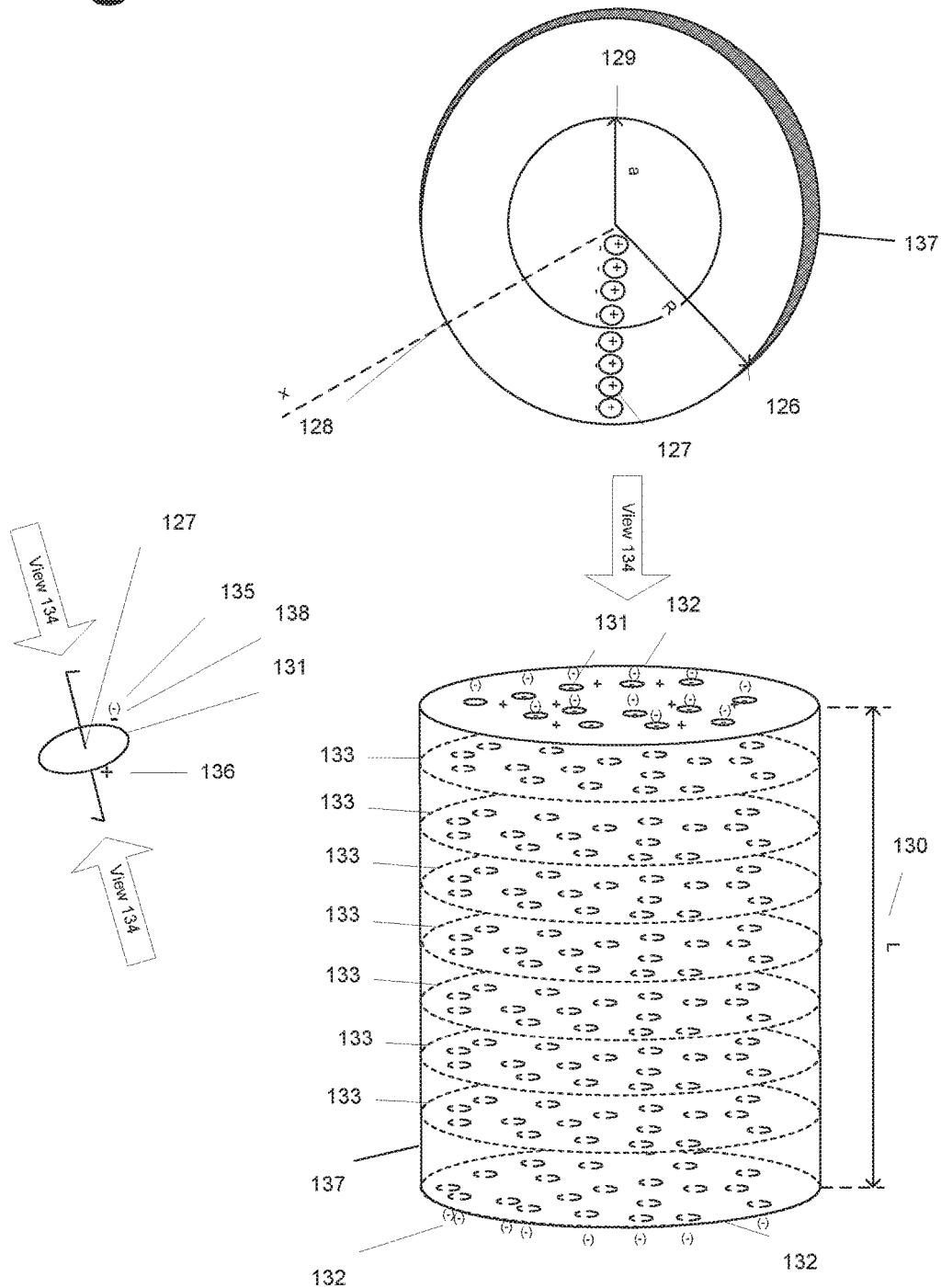
FIG. 12 illustrates a relativistic field difference from the charges in a magnetic material with aligned magnetic moments that can be amplified in one direction and not another.

FIG. 12 represents the terms or variables used in this line integral. 126 is the radius "R" of the cylindrical magnet 137. 128 is the electric field "x" intensity above the face of the face of the cylindrical magnet 137. The term of integration is 129 "a" that represent the positions of the magnetic moment electrons 127 from the center of the cylindrical magnet 137 to the outer edge of the cylindrical magnet 137. The length of the cylindrical magnet 137 represented by "L" 130. The cylinder can be divided into almost infinite number circular sheets 133 of molecules 131 with the same magnetic moments 127. This allows the changes to the electric fields 135 from the aligned magnetic moments 127 to sum or amplify the changes when the magnet is viewed 134 from the ends 132 of the cylinder 137 including when viewed 134 perpendicular to the magnetic moment 127 or above and below 134 the plane 131 of the unpaired electron 138 that makes up the magnetic moment 127.

$$\vec{E} = 2\pi kL \left[\frac{\vec{V}}{c} \times \Phi\right] \left(1 - \frac{x}{(x^2 + R^2)^{1/2}}\right) \frac{\text{Volts}}{\text{Meter}} \quad \text{(EQN 47)}$$

The electric field differences 135 from the aligned magnetic moments 127 that are different when viewed from different directions is today modeled mathematically as the magnetic field. These electric field differences 135 coevolved with the stationary positive charges 136 electric field that has the positive charge physically coupled to the magnet and the moving negative electric charges 138 that form the aligned magnetic moments 127 can be described by the mathematical description modeled mathematically as the magnetic field. When these electric field differences 135 are described by the mathematical description modeled mathematically as the magnetic field, this model is describing just a subset of the possible electric field differences 135 that are predicted by the new mathematical framework presented in this patent in equations (1) and (2).

If another similar magnetized magnetic cylinder 137 is brought near this magnetized cylinder 137 the coevolved electric fields 135 from the different charges 138 and 136 in different inertial reference frames will create a force that can try to minimize the electric field differences of the different charges caused by relativity. Today this force is known as the magnetic force today that is mathematically represented as an independent field known as the magnetic field.

This results in forces observed on the 2 cylinders 137 that are always in the direction that aligns the magnetic moments of the 2 cylinders. This force can be in a direction that allows the relative average velocities of the electrons that are components of the magnetic moments 131 of the 2 cylinders to be minimized or to align in parallel with each other the plane of electron current 131 of the unpaired electron that makes up the magnetic moment 127.

The physically correct Ampère model is based on the magnetic dipole moments 127 that are due to infinitesimally small loops of current 131 from the unpaired elections 138 in a volume of magnetic material 137. For a sufficiently small loop of current 131, I, and area, A, the magnetic dipole moment 127 is:

$$m = IA \text{ amperes} \cdot \text{meter}^2 \quad \text{(EQN 48)}$$

$$I = \frac{\text{Coulombs}}{\text{Second}} \text{ or amperes}, \quad A = \text{meter}^2 \quad \text{(EQN 49)}$$

The magnetic field for a uniformly magnetized cylinder 137 can be calculated from the area of the surface of the ends of the cylinder 132 multiplied by the length 130 of the cylinder 137 to calculate the cylinder's volume by the following equation.

$$B_Z = \frac{\mu_0 m}{\text{Volume}} \text{Volt} \cdot \frac{\text{Second}}{\text{meter}^2} \text{ or Tesla} \quad \text{(EQN 50)}$$

The Ampère model that calculates the forces observed from a cylinder of magnetic material 137 from the cylinder's magnetic field is now missing a number of elements that can produce different forces from the same magnetic field. This makes Ampère model just a special case of a broader mathematical framework that has been presented in equations (1) and (2).

This first element that is missing from the Ampère model is an incomplete representation of the electric current in the infinitesimally small loops of current 131 from the unpaired elections 138. The relative velocity difference of the circulating unpaired electrons 138 to the stationary positive charges 136 is the basis for the forces observed from the interactions of these charges with other materials.

This incomplete representation of the magnetic moment 127 is based instead on the units of $$\frac{\text{Coulombs}}{\text{Seconds}}$$

used in the magnetic moment 127 that can be represented by smaller amount of charge flowing thru a fixed area at a higher relative velocity or as a larger amount of charge flowing thru the same fixed area at a lower velocity. This velocity differences create different changes to the electrons electric field 135 that is not represented in the mathematical framework that the magnetic field is describing.

This mathematical framework that based on the magnetic field ends up being just a special case that is defined by the characteristics of the material that the cylinder 137 is made of. Equation (50) can be converted to equations (51) (52) and (53) that represent the forces from the cylinder 137 using the difference of the relative velocity of the charges 136 and 138 used in equation (47). The relative velocity difference of the unpaired electrons that generate the magnetic moment can be approximately 20,000 M/S, $$B_Z = \nabla \times \vec{A} \text{ Volt} \cdot \frac{\text{Second}}{\text{meter}^2} \text{ or Tesla} \quad \text{(EQN 51)}$$

$$\vec{A} = \left[\frac{\mu_0 \vec{I}}{4\pi} \frac{1}{\varepsilon_o c^2}\right] = \frac{\vec{V}}{c}\left(\frac{\text{Charge}}{4\pi\varepsilon_o r^2}\right) = \frac{\vec{V}}{c}\Phi \frac{\text{Volts}}{\text{Meter}} \quad \text{(EQN 52)}$$

$$B_Z = \frac{\mu_0 m}{\text{Volume}} = -\nabla \times \frac{\vec{V}}{c}\Phi \text{ Tesla} \quad \text{(EQN 53)}$$

Equation (53) can now be reformulated to relate the magnetic moment 137 to the electric field 135 changes of the unpaired electron 138 that creates the magnetic moment 127 from the effects of relativity.

$$m = -\nabla \times \frac{\vec{V}}{c}\Phi \frac{\text{Volume}}{\mu_0} = -\nabla \times \frac{\vec{V}}{c}\Phi \cdot \varepsilon_o c^2 \cdot \text{Volume} \quad \text{(EQN 54)}$$

Equation (54) for the magnetic dipole moment 127 in this form now includes the velocity and allows for the changes to the electric field 135 from the effects of relativity that give rise to the unpaired magnetic moments 127 to amplify as an electric field can be amplified over a flat surface. This equation also describes the magnetic field as a special case of equations (1) and (2).

This new mathematical framework based on equations (1) and (2) now segregates the electric fields from charges 136 and 138 having different relative velocities that do not follow all the rules of superposition that static electric fields can follow. These same sets of exceptions to the rules of superposition are the same set of exceptions that cause the magnetic field to be modeled as a separate field from a magnet when all the charges 136 and 138 in the magnet are in inertial reference frames that are coupled together by the physical structure of the magnet.

The relativistic electric field 135 from a magnetic cylinder 137 is created from the charges 136 and 138 that have different velocities from the unpaired electrons 138 that create the magnetic dipole moment 127 as compared to the drift velocity an electric current in a copper wire. These relativistic electric fields 135 from a magnetic cylinder 137 that are different inertial reference frames that are coupled to the stationary materials that the charges reside that allow these electric fields to follow a subset of the rules of superposition. This new mathematical framework allows for a magnetic cylinder 137 to observe a different difference electric field from a wire with an electric current that is different as compared to the difference electric field a wire with an electric current observes from a magnetic cylinder 137.

The differences in the relativistic electric fields 135 from a magnet 137 or a wire with an electric current can only observed if the magnet 137 is electrically isolated from the electric current in a wire that is brought near to it. That also includes that the wire or magnet 137 is electrically isolated from earth ground or any other conductive object that is near to either the wire or magnet 137. This also includes not electrically connecting either wire or magnet 137 object to ground after wire has an electric current flowing thru it before the wire and magnet 137 are brought close to each other.

FIG. 13 illustrates mathematically the forces from the relativistic electric fields 141, 155 from a copper wire 142 conducting an electric current 139, 153 and a uniformly magnetized block 143 with aligned magnetic moments of the unpaired electrons 156 that are created from the infinitesimally small loops of current 154 from the unpaired electrons 156 that are in close proximity of each other.

The moving negative charges 139 that form the electric current 153 moving to the right with a drift velocity of about 1 cm/second create a uniform relativistic electric field 141 around the round wire 142 from the moving negative 139 charges when they are viewed perpendicular to their drift velocity. The mathematical framework used today describes these differences as a separate magnetic field.

The unpaired electrons 156 that create the infinitesimally small loops of current 154 that make up the magnetic moment create a relativistic electric field 155 that is only observed above and below the plane of the unpaired electrons 156 motion that today is represented as a North Pole and South Pole of a magnetic field. When the plane of the unpaired electrons 156 is observed from the edge of the plane the infinitesimally small loops of current 154 the opposite direction of motions of the aligned unpaired electrons 156 that is observed create relativistic electric fields 155 that do not produce a force on the magnet.

The unpaired electrons 156 that create the infinitesimally small loops of current 154 that make up the magnetic moment are moving in a circle at a velocity that is in the range of 20,000 meters/second. The relativistic electric field 155 from the unpaired electrons 154 create a relativistic electric field 155 that is created from electric charges 154 that are in different inertial reference frames from the negative charges 139 flowing in the electric wire 142 that do not follow the same rules of superposition that static electric fields follow. The mathematical framework used today describes these differences as a separate magnetic field.

When the Wire 142 has an electric current 139 flowing through it that produces a positive electric field from the stationary positive charges 140 and a negative electric field 141 from the moving negative charges 139 that is modified by the effects of relativity. The interactions of these two electric fields, the two different charges 139, 140 create a total observed electric field 141 that is different depending on the view of the wire, the shape of the wire and the velocity of the drift electric current that is about 1 cm/sec for copper.

The bar magnetic 143 also has a positive electric field from the stationary positive charges 140 and a negative electric field from the unpaired electrons 154 that make up the magnetic moment. The interactions of these two different electric fields from the two different charges 154 and 140 create a total electric field 155 that is different depending on the view of the wire, the shape of the wire and the velocity of the electric current of 20,000 cm/sec that makes up the magnetic moment.

These differences create two difference or relativistic electric fields 155 and 141 that are created from charges in two different inertial reference frames that do not follow the same rules of superposition that the static charges follow. This then allows the positive charges 140 in the conductor 142 and the bar magnet 143 to observe different electric fields from the other objects negative charges with different velocities.

If the resulting force 148 on the wire 142 and the bar magnet 143 is determined from the interactions of these different electric fields, instead of using the framework based on the magnetic field, we have a framework that describe the forces observed from the conductor 142 and the bar magnet 143 as a separate set of equations.

Determining forces 144 to 152 on the conductor 142 and the bar magnet 143 allow us to take into account the materials and shape of the conductor 142 and bar magnet 143 to determine the total force 148 on the conductor 142 and the bar magnet 143.

Total force on the conductor 142 can be described by four electric field interactions with the bar magnet 143 that produces four forces on the conductor 142 as separate forces 144, 145, 146 and 147 that can be represented as:

$$\vec{F_A} + \vec{F_B} + \vec{F_C} + \vec{F_D} = \text{Total force on conductor} \quad \text{(EQN 55)}$$

Repulsive force on the conductor 142 from the electric field interactions from the positive charges in the conductor 142 with the positive charges in the bar magnet 143 can represented as:

$$\vec{F_A} = \vec{F}\,[\vec{E}_{Conductor}(+) <=> \vec{E}_{Bar\,Magnet}(+)] \quad \text{(EQN 56)}$$

Attractive force on the conductor 142 from the electric field interactions from the positive charges in the conductor 142 with the unpaired electrons 154 that make up the magnetic moment in the bar magnet 143 can represented as:

$$\vec{F_B} = \vec{F}\,[\vec{E}_{Conductor}(+) >< \vec{E}_{Bar\,Magnet}(-)] \quad \text{(EQN 57)}$$

Repulsive force on the conductor 142 from the electric field interactions from the moving negative charges that makeup the electric current in the conductor 142 with the unpaired electrons 154 that make up the magnetic moment in the bar magnet 143 can represented as:

$$\vec{F_C} = \vec{F}\,[\vec{E}_{Conductor}(-) <=> \vec{E}_{Bar\,Magnet}(-)] \quad \text{(EQN 58)}$$

Attractive force on the conductor 142 from the electric field interactions from the moving negative charges that makeup the electric current in the conductor 142 with the positive charges in the bar magnet 143 can represented as:

$$\vec{F_D} = \vec{F}\,[\vec{E}_{Conductor}(-) >< \vec{E}_{Bar\,Magnet}(+)] \quad \text{(EQN 59)}$$

Then the total force on the bar magnet 143 is described by four electric field interactions with the conductor 142 that produces 4 separate forces 149, 150, 151, 152 on the bar magnet 143 that can be represented as:

$$\vec{F_E} + \vec{F_F} + \vec{F_G} + \vec{F_H} = \text{Total force on the Bar Magnet} \quad \text{(EQN 60)}$$

Repulsive force on the bar magnet 143 from the electric field interactions from the positive charges in the conductor 142 with the positive charges in the bar magnet 143 can represented as:

$$\vec{F_E} = \vec{F}\,[\vec{E}_{Bar\,Magnet}(+) <=> \vec{E}_{Conductor}(+)] \quad \text{(EQN 61)}$$

Attractive force on the bar magnet 143 from the electric field interactions from the positive charges 140 in the conductor 142 with the unpaired electrons 154 that make up the magnetic moment in the bar magnet 143 can represented as:

$$\vec{F_F} = \vec{F}\,[\vec{E}_{Bar\,Magnet}(-) >< \vec{E}_{Conductor}(+)] \quad \text{(EQN 62)}$$

Repulsive force on the bar magnet 143 from the electric field interactions from the moving negative charges that makeup the electric current in the conductor 142 with the unpaired electrons 154 that make up the magnetic moment in the bar magnet 143 can represented as:

$$\vec{F_G} = \vec{F}\,[\vec{E}_{Bar\,Magnet}(-) <=> \vec{E}_{Conductor}(-)] \quad \text{(EQN 63)}$$

Attractive force on the bar magnet 143 from the electric field interactions from the moving negative charges that makeup the electric current in the conductor 142 with the positive charges in the bar magnet 143 can represented as:

$$\vec{F_H} = \vec{F}\,[\vec{E}_{Bar\,Magnet}(-) >< \vec{E}_{Conductor}(+)] \quad \text{(EQN 64)}$$

Determining the forces on these wires as 8 separate force vectors 144, 146, 149, 151, 145, 147, 150 and 152 allows these same forces to be modeled mathematically as a special case of a mathematical framework, with the simpler mathematical framework of a magnetic field with a magnetic force that creates the same force on the bar magnet 143 and the conductor 142 if any set of simple conditions are met.

The main condition that allows the simpler mathematical framework of a magnetic field to correctly describe the total force 148 between the bar magnet 143 and the conductor 142 is that there is a path for the mobile electrons in either the bar magnet 143 and the conductor 142 to migrate between the bar magnet 143 and the conductor 142 when the electric current is flowing thru the conductor as an electric current.

This path can be a static conductive or semi-conductive or high resistance path between the bar magnet 143 and the conductor 142. This path can also be a charge transfer to a 3rd charge holding object that is in proximity to the bar magnet 143 and the conductor 142. This 3rd charge object includes the earth ground or a ground plane that can be connected to either or both the bar magnet 143 and the conductor 142 by either an electrical means or by some mechanical means.

If there is not a path between the bar magnet 143 and the conductor 142 for the mobile electrons to migrate between them, then these forces 144, 146, 149, 151, 145, 147, 150 and 152 can be represented as interactions of electric fields from charges in different inertial reference frames that do not follow all the rules of superposition. Then that allows an assembly of conductors 142 and the bar magnet 143 to allow the forces 144, 146, 149, 151, 145, 147, 150 and 152 to not to sum to zero.

These conditions that allow the forces 144, 146, 149, 151, 145, 147, 150 and 152 to not to sum to zero allow for an electrostatic power supply to be used where all the source electrons are only derived from the conductor 142 and not from another source like earth ground or a source that has in the past derived its mobile electrons from earth ground or a source that is in the direction of the total force 148 on the conductor 142 and the bar magnet 143 by direct or indirect means.

When these conditions are met the positive charges 140 in the copper wire conductor 142 will observe an electric field 141 from the unpaired electrons 154 that make up the magnetic moment in the bar magnet 143 as:

$$\vec{E}_{Magnet} = 2\pi k L \left[ \frac{\vec{V}_{20,000\,m/s}}{c\,m/s} \times \Phi \right] \left(1 - \frac{x}{(x^2 + R^2)^{1/2}}\right) \frac{\text{Volts}}{\text{Meter}} \quad \text{(EQN 65)}$$

The positive charges 140 in the bar magnet 143 will observe an electric field 155 from the round conductive copper wire 142 from the moving negative 139 charges as:

$$\vec{E}_{Current} = 2\pi k L \left[ \frac{V_{.001\,m/s}}{c} \times \Phi \right] \frac{\text{Volts}}{\text{Meter}} \quad \text{(EQN 66)}$$

The velocity of the negative charges 154 and 139 are in different inertial reference frames in the copper wire conductor 142 and the bar magnet 143 so that these electric field differences will not follow the rules of superposition that static electric fields follow. These differences give rise to the magnetic force that the magnetic field was created to describe.

If the copper wire conductor 142 or the bar magnet 143 is made of different materials (e.g., Graphene, Nichrome, or a Superconductor), with different velocities for the negative charges, these materials would create different total electric field differences 155, 141 would generate total forces 148 the copper wire conductor 142 or the bar magnet 143 that is not taken into account with the mathematical framework based on the magnetic field.

The shape is not represented in the mathematical framework based on the magnetic field that describe magnetic forces. The mathematical framework based on the magnetic field does not differentiate the forces observed from a cylindrical wire or a flat wire with the same amount of current for the same wire cross sectional area.

Figure 14A:
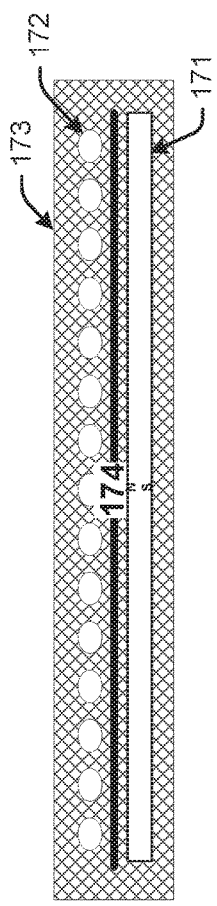
FIGS. 14A, 14B and 14C illustrate a cutaway view of an example assembly of one plans of wire conductors and a magnetic block with power supplies and wiring diagram, wherein (A) is an edge view of the wires in a non-conductive frame, (B) is a top view of conductive wires in a non-conductive frame, and (C) is an angled view of magnetic material with aligned magnetic moments.
Figure 14B:
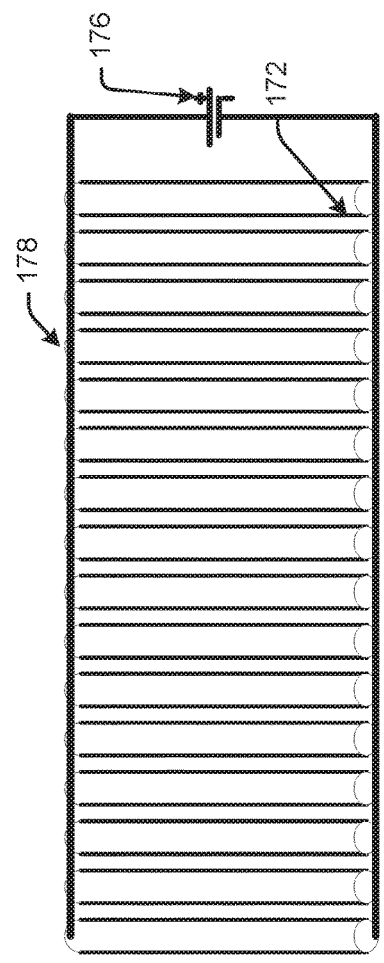
Figure 14C:
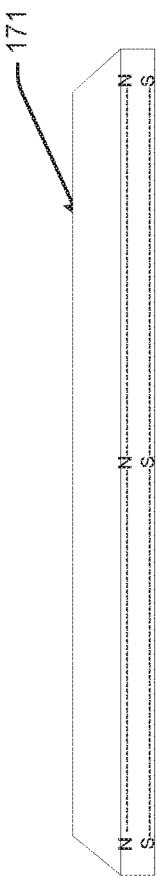

FIGS. 14A, 14B and 14C illustrate a cutaway view of an example assembly of one plane of wire conductors 172 and bar magnet 171 with power supplies and wiring diagram 178, wherein (A) is an edge view of the wire conductors 172 and bar magnet in a non-conductive frame 173, (B) is a top view of round copper wires 172 in a non-conductive frame 173, and (C) is an angled view of the bar magnet 171. The figures illustrate graphically an edge view of a sheet of square of round copper wires 172 and bar magnet 171 made of two different materials in a nonconductive frame 173. The round copper wires 172 and bar magnet 171 are electrically isolated from each other by a non-conducting sheet 174 as an example of a sheet of Kapton.

The wires are powered by electrically isolated power supply 176 that is electrically isolated from earth ground or any other large ground plane. The physical diagram and schematic of the top sheet of the wires 178 diagrams the wires being powered in parallel by power supply 176.

The schematic of the bar magnet 171 diagrams a magnet with the North Pole on the upper face and the South Pole on the bottom face. The bar magnet 171 is diagramed to have the majority the magnetic moments aligned vertical with the faces of the magnet and not have multiple different poles on the faces of the magnet, Other configurations are possible from the arrangement of poles in the magnet and placement of the wires.

FIG. 15 illustrates the electrical schematic of the electrical circuit of the assembly of 171, 172, 177, 174, and 179. The schematic also illustrates a method to isolate the assembly from the effects of external mobile charges migrating in response to the electric field differences that the assembly produces.

Earth ground 182 is connected to a conductive sheet 179. Isolated ground or chassis ground 181, 183 are connected to semi-conductive sheets 178,184 that sandwiches the conducive sheet 179 between them. The assembly of sandwiched sheets 178,179 and 184 is placed between the earth ground and the assembly of 171, 172, 177, 174, 179. The materials used for conductive sheets 178,179 and 184 can allow for higher drift velocities of the electronic current that is greater than is observed in conductive copper sheets for 178,179 and 184.

The schematic diagrams the power supply 177 that powers the plane of the copper wires 172 thru the conductive wire 190 as physically above the plane of the copper wires 172 to mitigate the effects from charge migration.

The solid non-conductive assembly 179 contains the copper wire conductor 172, the bar magnet 171, power supply 177, conductive wire 190, and insulating sheet 174 as one solid unit.

Figure 16:
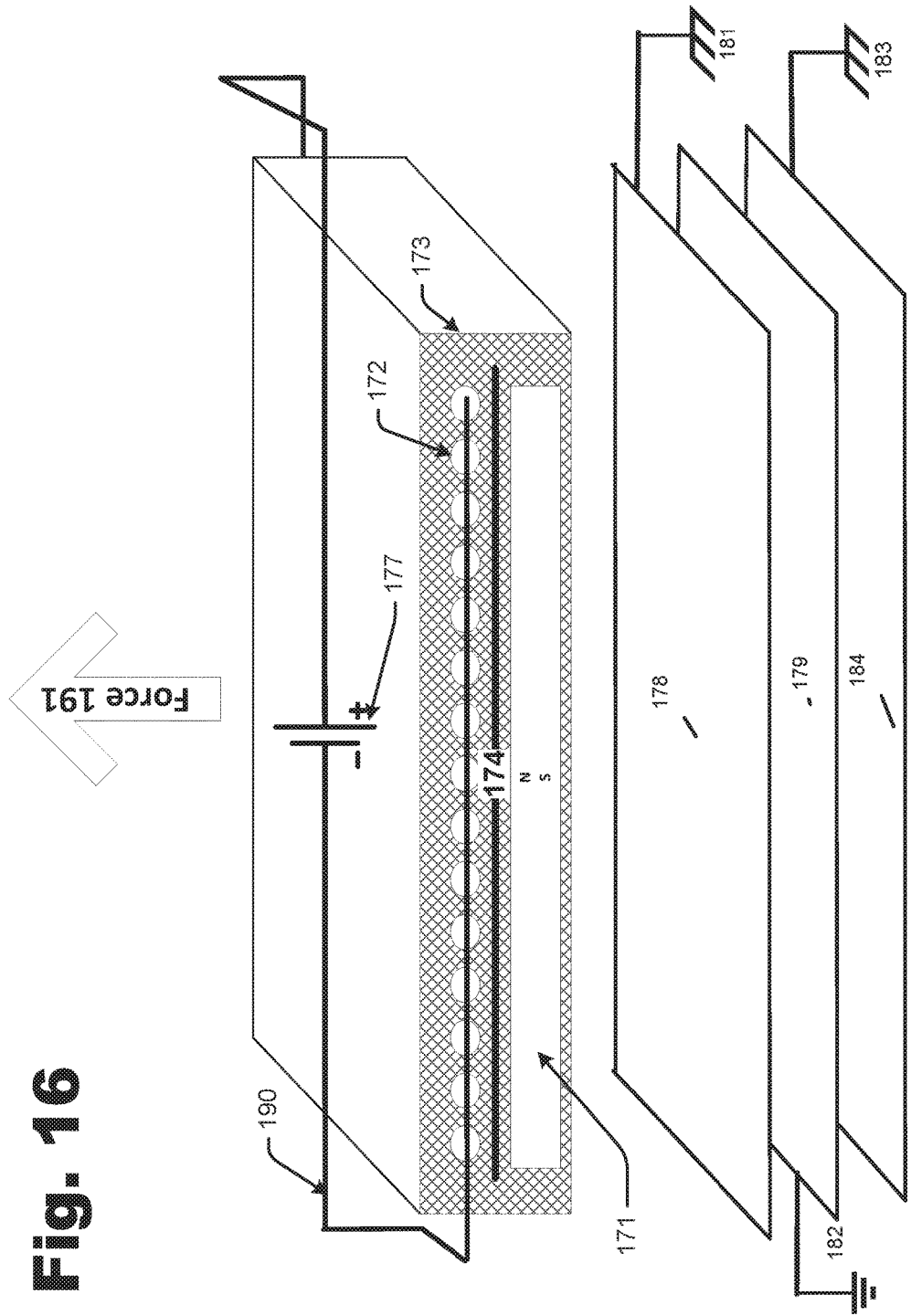
FIG. 16 illustrates an example assembly that is powered producing an external force

FIG. 16 illustrates the electrical schematic of the electrical circuit and physical placement of the bar magnet 171 the power supply 177 that powers the sheet of conductors 172, and the external conductive sheets 178,179,184 that are placed between the earth/ground that shields charges from migrating in the earth to counter act the electric field differences that the device produces.

The relativistic electric fields from the aligned magnetic moments in the bar magnet 171 as compared to the relativistic electric fields from the motions of the electrons in the wires in the plane of wire conductors 172 have different electric fields that do not follow the rules of superposition such that the bar magnet 171 to observe different electric fields from the sheet of wire conductors 172 that is different than the sheet of wire conductors 172 observes from the bar magnet 171.

These two different electric fields result in different forces to be observed from the bar magnet 171 and the plane of wire conductor 172. This then results on a force 191 on the assembly that only requires the assembly to be powered by one electrically isolated power supply.

The resulting force 191 can be implemented to propel spacecraft using electricity only. The same force can also be implemented for any propulsion by a force to move an object with electricity in a vacuum or in any medium.

It is noted that the examples shown and described are provided for purposes of illustration and are not intended to be limiting. Still other examples are also contemplated.

The invention claimed is:

1. A method comprising:
   producing a force on a surface by the interaction of differences of electric fields from charges in relative motion in a conductor or comprising the magnetic moments of a magnetic material from paired conductors or conductors and magnetic materials with different physical characteristics;
   wherein the paired conductors or conductors and magnetic materials are in relative motion relative to one another.

2. The method of claim 1, wherein the paired conductors or conductors and magnetic materials have different shapes.

3. The method of claim 1, wherein the paired conductors or conductors and magnetic materials are made of different materials that have different electron drift velocities.

4. The method of claim 1, wherein the paired conductors or conductors and magnetic materials are made of different materials that have different charge densities.

5. The method of claim 1, wherein the paired conductors or conductors and magnetic materials have different charge mobilities.

6. The method of claim 1, wherein the paired conductors or conductors and magnetic materials are positioned next to each other.

7. The method of claim 1, wherein the paired conductors or conductors and magnetic materials are made of different conductive or semi-conductive materials.

8. The method of claim 1, wherein the paired conductors or conductors and magnetic materials are stationary.

9. A system comprising:
   a first conductor of a first shape, the first conductor made of a first type of conductive material; and
   a second conductor or magnetic materials of a second shape that is different than the first shape, the second conductor or magnetic materials is made of a second conductive or semi-conductive material that is different than the first type of conductive material;
   wherein the first, second conductors and magnetic move at different velocities.

10. The system of claim 9, wherein the power sources and wire connections to the first and second conductors or magnetic materials are in the same inertial reference frame as the conductors that they are attached to.

11. The system of claim 9, wherein the first and second conductors and magnetic materials are electrically conductive and have different internal structures.

12. The system of claim 9, wherein the first, second conductors and magnetic are provided within a non-conductive assembly.

13. A method comprising:
producing a force on a surface by the interaction of differences of electric fields from charges in relative motion in a conductor or comprising the magnetic moments of a magnetic material from paired conductors or conductors and magnetic materials with different physical characteristics;
wherein the paired conductors or conductors and magnetic materials are powered by independent electrically isolated electrical power sources.

14. A method comprising:
producing a force on a surface by the interaction of differences of electric fields from charges in relative motion in a conductor or comprising the magnetic moments of a magnetic material from paired conductors or conductors and magnetic materials with different physical characteristics;
wherein the paired conductors or conductors and magnetic materials do not contact other conductors or ground after being electrically powered.

15. A system comprising:
a first conductor of a first shape, the first conductor made of a first type of conductive material; and
a second conductor or magnetic materials of a second shape that is different than the first shape, the second conductor or magnetic materials is made of a second conductive or semi-conductive material that is different than the first type of conductive material;
wherein the first, second conductors and magnetic are accelerated at different rates.

* * * * *